United States Patent
Kitazato et al.

(10) Patent No.: US 9,264,772 B2
(45) Date of Patent: Feb. 16, 2016

(54) RECEPTION APPARATUS, RECEPTION METHOD, AND PROGRAM

(71) Applicant: Sony Corporation, Tokyo (JP)

(72) Inventors: Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 13/718,397

(22) Filed: Dec. 18, 2012

(65) Prior Publication Data

US 2013/0185758 A1 Jul. 18, 2013

(30) Foreign Application Priority Data

Jan. 18, 2012 (JP) ................................. 2012-007701

(51) Int. Cl.

| | |
|---|---|
| H04N 21/231 | (2011.01) |
| H04N 21/418 | (2011.01) |
| H04N 21/442 | (2011.01) |
| H04N 21/235 | (2011.01) |
| H04N 21/647 | (2011.01) |
| H04N 21/8547 | (2011.01) |
| H04N 21/45 | (2011.01) |
| H04N 21/236 | (2011.01) |
| H04N 21/2362 | (2011.01) |
| H04N 21/43 | (2011.01) |
| H04N 21/858 | (2011.01) |

(52) U.S. Cl.
CPC ........... *H04N 21/45* (2013.01); *H04N 21/2362* (2013.01); *H04N 21/23614* (2013.01); *H04N 21/4307* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 2004/0172662 | A1* | 9/2004 | Danker | H04N 7/17318 725/135 |
| 2006/0098821 | A1* | 5/2006 | Tomiyasu | H04N 5/4401 380/200 |
| 2007/0220564 | A1* | 9/2007 | Yano | H04N 21/235 725/86 |
| 2010/0154007 | A1* | 6/2010 | Touboul et al. | 725/60 |
| 2010/0319028 | A1* | 12/2010 | Park | H04N 5/44543 725/43 |
| 2013/0179538 | A1* | 7/2013 | Dutta | H04L 43/0817 709/217 |

* cited by examiner

*Primary Examiner* — Brian T Pendleton
*Assistant Examiner* — Jean D Saint Cyr
(74) *Attorney, Agent, or Firm* — Hazuki International, LLC

(57) ABSTRACT

Disclosed herein is a reception apparatus including: a reception block configured to receive AV content; a definition information acquisition block configured to acquire definition information defining the life cycle of an application program to be executed in linkage with the AV content; an application acquisition block configured to acquire the application program distributed over a network in accordance with the acquired definition information; and a control block configured to control the performance of the acquired application program.

15 Claims, 17 Drawing Sheets

```
hyperlink_descriptor () {
      descriptor_tag                          8
      descriptor_length                       8
      hyper_linkage_type                      8
      link_destination_type                   8
      selector_length                         8
      for(i=0;i<selector_length;i++) {
            selector_byte                     8
      }
      for(i=0;i<N;i++) {
            private_data                      8
      }
]
```

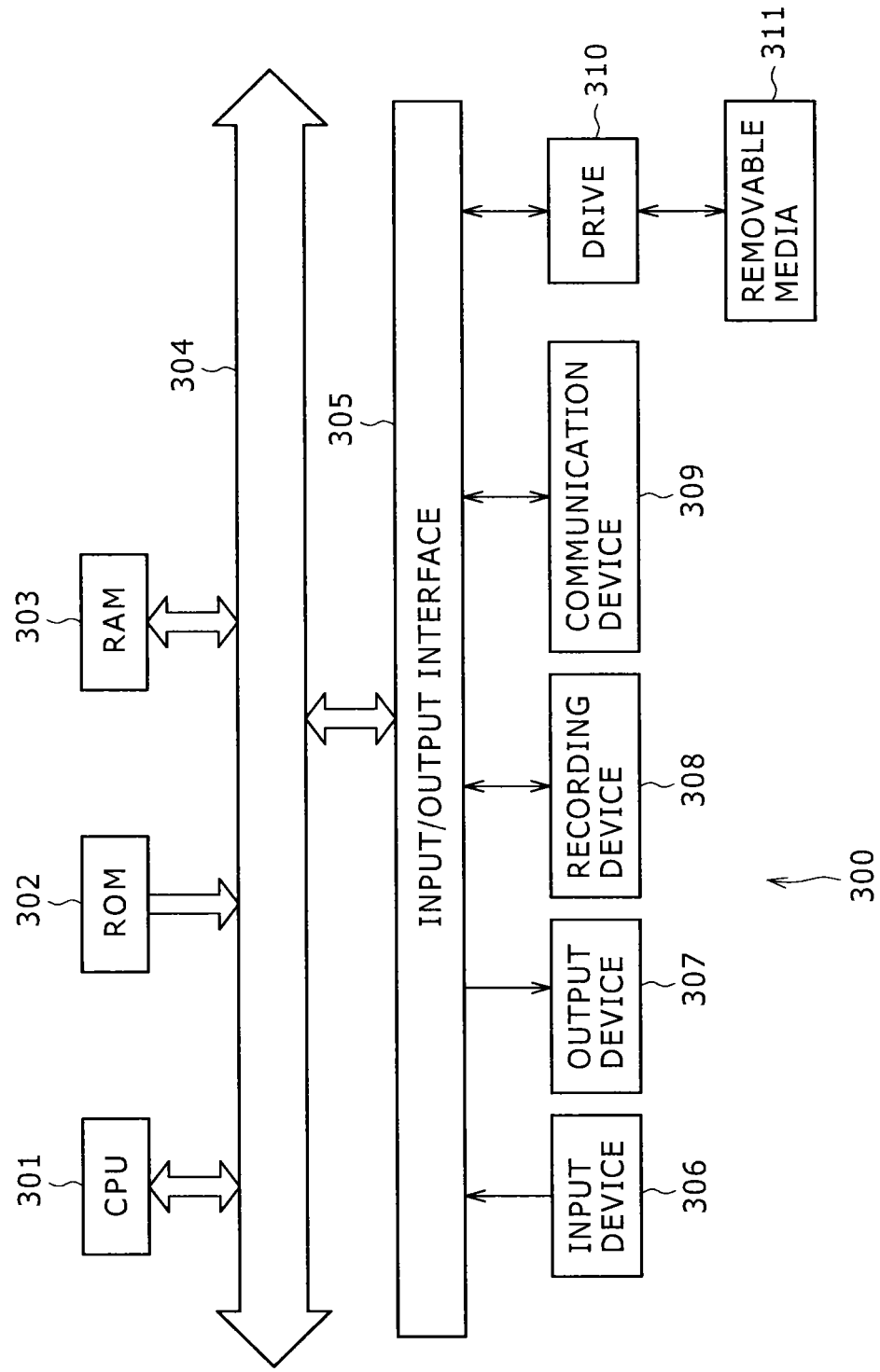

RECEPTION APPARATUS, RECEPTION METHOD, AND PROGRAM

BACKGROUND

The present disclosure relates to a reception apparatus, a reception method, and a program. More particularly, the disclosure relates to a reception apparatus, a reception method, and a program for offering application programs to be executed in linkage with AV (Audio-Video) content in hybrid broadcasting.

With the advent of digital TV broadcasting in recent years, data broadcasting in BML (Broadcast Markup Language) has found widespread acceptance. Today, almost all TV sets are capable of handling BML-based data broadcasting.

Studies are now underway to introduce so-called hybrid broadcasting involving the use of not only broadcast waves but also communications for accessing predetermined servers on the Internet to acquire application programs to be performed in linkage with TV programs (e.g., see Japanese Patent Laid-Open No. 2011-66556).

SUMMARY

From the viewpoint of TV program viewers, data broadcasting and hybrid broadcasting look similar in that they involve offering application programs in linkage with TV programs. On the one hand, data broadcasting may be implemented without connection to the Internet and provides relatively simple functions. On the other hand, hybrid broadcasting typically requires connection with the Internet and provides relatively sophisticated functions. These two types of broadcasting are expected to coexist from now on and be used selectively.

At present, however, viable technology has yet to be established for allowing hybrid broadcasting to offer application programs to be performed in linkage with AV content such as TV programs.

The present disclosure has been made in view of the above circumstances and provides innovative arrangements for offering application programs to be executed in linkage with AV content in hybrid broadcasting.

According to one embodiment of the present disclosure, there is provided a reception apparatus including: a reception block configured to receive AV content; a definition information acquisition block configured to acquire definition information defining the life cycle of an application program to be executed in linkage with the AV content; an application acquisition block configured to acquire the application program distributed over a network in accordance with the acquired definition information; and a control block configured to control the performance of the acquired application program.

Preferably, the definition information acquisition block may acquire the definition information transmitted along with the AV content. If the acquired definition information designates a start of the application program, the control block may start the acquired application program; if the acquired definition information designates an end of the application program, the control block may terminate the currently executing application program.

Preferably, the definition information may define the life cycles of a plurality of the application programs. The control block may control the performance of each of the application programs in accordance with the acquired definition information.

Preferably, in accordance with information designating an acquisition destination of the definition information transmitted along with the AV content, the definition information acquisition block may acquire first definition information which is distributed over the network and which defines the life cycle of a first application program. If the acquired first definition information designates a start of the first application program, the control block may start the first application program.

Preferably, if an instruction is given along with the AV content to designate a change of the application program in accordance with the progress of the AV content, the definition information acquisition block may acquire second definition information defining the life cycle of a second application program to be executed next to the currently executing first application program, the second definition information being distributed over the network. In accordance with the acquired second definition information, the application acquisition block may acquire the second application program distributed over the network. The control block may then start the acquired second application program and terminate the currently executing first application program.

Preferably, the reception apparatus of the embodiment of this disclosure may further include a set block configured to set a timing for changing from the currently executing first application program to a second application program to be executed next in accordance with the progress of the AV content. At the timing of changing from the first application program to the second application program, the definition information acquisition block may acquire second definition information defining the life cycle of the second application program. In accordance with the acquired second definition information, the application acquisition block may acquire the second application program distributed over the network. The control block may then start the acquired second application program and terminate the currently executing first application program.

Preferably, if a user designates a start of the performance of the application program, the definition information acquisition block may acquire the definition information.

Preferably, the reception apparatus of the embodiment of this disclosure may further include a data broadcast control block configured to control the performance of a data broadcast application program transmitted along with the AV content.

The reception apparatus may be an independent apparatus or an internal block constituting part of an apparatus.

According to another embodiment of the present disclosure, there is provided a reception method for use with a reception apparatus, the reception method including: causing the reception apparatus to receive AV content; causing the reception apparatus to acquire definition information defining the life cycle of an application program to be executed in linkage with the AV content; causing the reception apparatus to acquire the application program distributed over a network in accordance with the acquired definition information; and causing the reception apparatus to control the performance of the acquired application program.

According to a further embodiment of the present disclosure, there is provided a program for causing a computer to function as an apparatus including: a reception block configured to receive AV content; a definition information acquisition block configured to acquire definition information defining the life cycle of an application program to be executed in linkage with the AV content; an application acquisition block configured to acquire the application program distributed over a network in accordance with the acquired definition information; and a control block configured to control the performance of the acquired application program.

Where the reception apparatus, reception method, and program embodying the present disclosure are in use, AV content is first received. Then, the definition information defining the life cycle of an application program to be executed in linkage with that AV content is acquired. In accordance with the acquired definition information, the application program distributed over a network is obtained. The performance of the obtained application program is then controlled.

Thus, according to the reception apparatus, reception method, and program embodying this technology, application programs to be executed in linkage with AV content may be provided in hybrid broadcasting.

BRIEF DESCRIPTION OF THE DRAWINGS

FIG. 19 is a block diagram showing a typical structure of a computer.

DETAILED DESCRIPTION OF THE PREFERRED EMBODIMENTS

Some preferred embodiments of the present disclosure are explained below in reference to the accompanying drawings.
<First Embodiment>
[Typical Configuration of the Broadcasting System]

Figure 1:
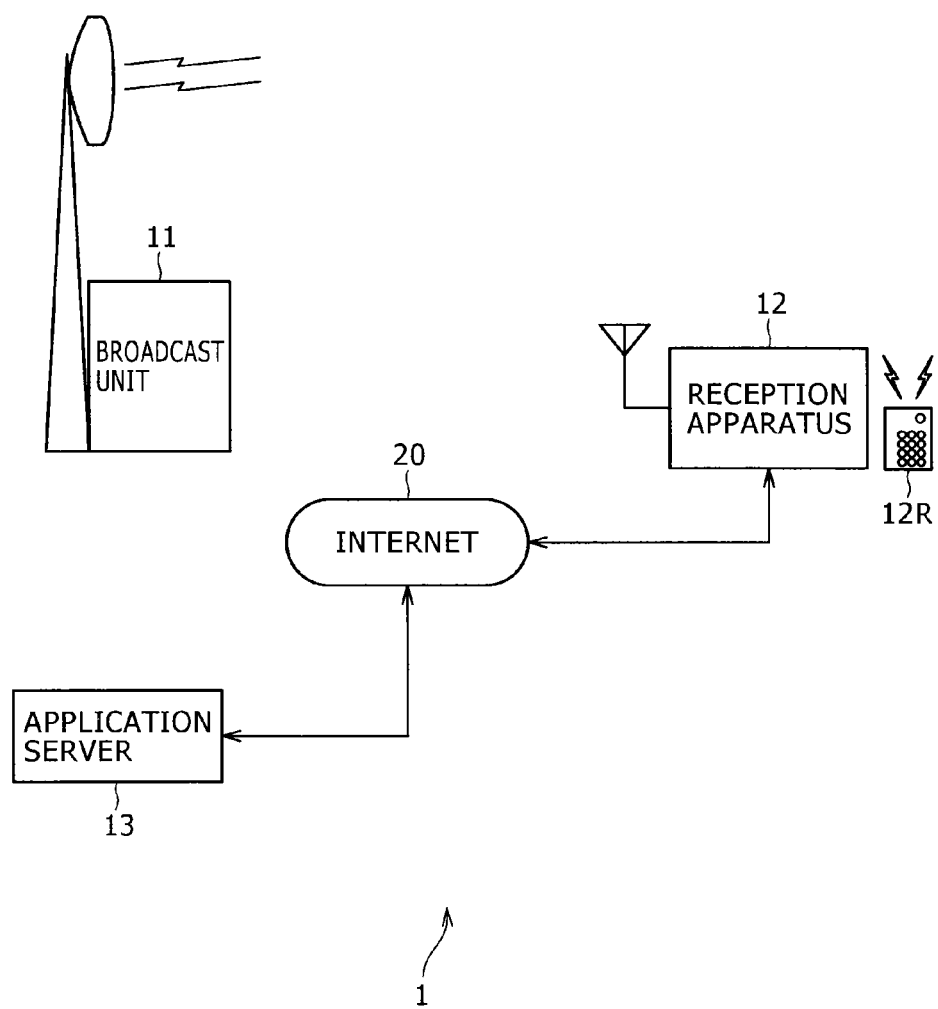
FIG. 1 is a schematic view showing a typical configuration of a broadcasting system as a first embodiment of this disclosure.

FIG. 1 shows a typical configuration of a broadcasting system 1 as the first embodiment of the present disclosure. The broadcasting system 1 includes a broadcast unit 11, a reception apparatus 12, and an application server 13. The reception apparatus 12 and application server 13 are interconnected via the Internet 20.

The broadcast unit 11 transmits digital TV broadcast signals of AV content such as TV programs and CM's.

The reception apparatus 12 receives a broadcast signal transmitted from the broadcast unit 11 and acquires pictures and sounds of the AV content represented by that broadcast signal. The reception apparatus 12 proceeds to output the acquired pictures to a display device and the sounds to speakers.

Also, the reception apparatus 12 receives commands on infrared rays coming from a remote controller 12R reflecting a user's operations. In accordance with the commands, the reception apparatus 12 performs such operations as changing of channels. The remote controller 12R includes a "d" button and an "i" button to be operated for viewing data broadcasting and hybrid broadcasting, respectively. In accordance with the manipulations of these buttons, the reception apparatus 12 carries out operations for viewing data broadcasting or hybrid broadcasting. Alternatively, GUI (Graphical User Interface) operations may be carried out on a display screen instead of on the remote controller 12R to give instructions to view data broadcasting or hybrid broadcasting.

The reception apparatus 12 may be set up as a stand-alone apparatus or incorporated in a TV set, a video recorder or the like. A detailed structure of the reception apparatus 12 will be discussed later in reference to FIG. 2.

The broadcast unit 11 transmits, as part of the broadcast signal, definition information defining the life cycle of an Internet-linked application. In this context, the Internet-linked application is an application program to be executed in linkage with AV content and acquired from the application server 13 connected to the Internet 20.

With the first embodiment, the definition information is described in an AIT (Application Information Table). For example, the definition information described in the AIT defining the life cycle of an Internet-linked application may include descriptions of designated operations such as "Auto Start," "Present," and "Kill." The description "Auto Start" specifies that the reception apparatus 12 is to execute the Internet-linked application in question immediately and automatically. The description "Present" specifies that the automatic execution of the Internet-linked application is not to be in effect. And the description "Kill" specifies that the execution of the Internet-linked application in the reception apparatus 12 is to be terminated.

Also, the AIT includes the description of a URL (Uniform Resource Locator) of, say, the application server 13 as information designating the destination from which to acquire each of the Internet-linked applications.

Based on the definition information described in the AIT, the reception apparatus 12 may acquire an Internet-linked application set to be executed immediately and automatically and execute the acquired application accordingly, for example. At this point, in accordance with the definition information described in the AIT, the reception apparatus 12 may access the application server 13 via the Internet 20 to acquire the Internet-linked application of interest.

The application server 13 manages Internet-linked applications to be executed in linkage with the AV content broadcast by the broadcast unit 11. For example, the application server 13 may be provided by a broadcasting organization broadcasting TV programs using the broadcast unit 11.

In response to queries from the reception apparatus 12, the application server 13 provides Internet-linked applications under its management to the reception apparatus 12 via the Internet 20.

The broadcasting system 1 is configured as described in the above paragraphs.

[Typical Structure of the Reception Apparatus]

Figure 2:
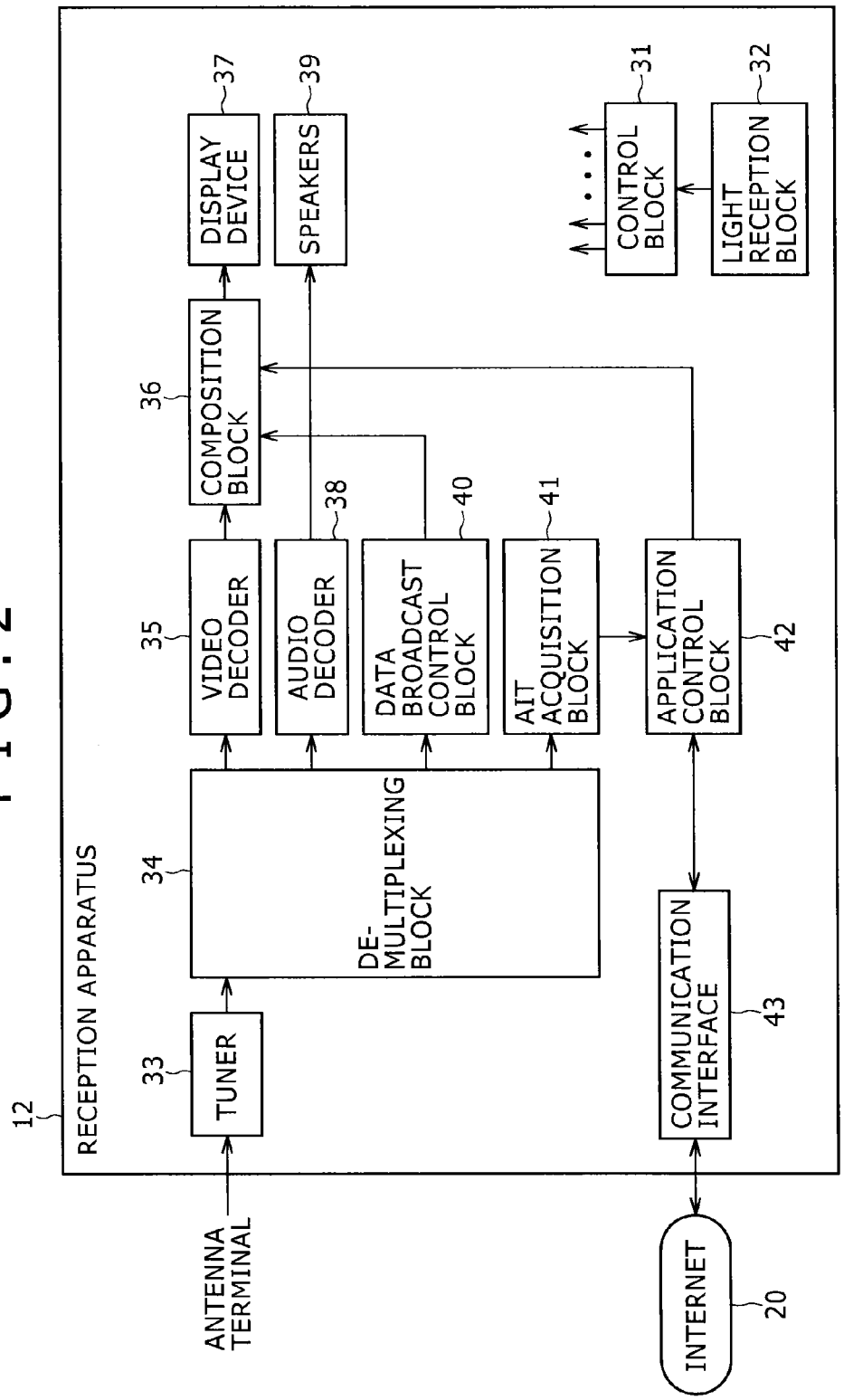
FIG. 2 is a block diagram showing a typical structure of a reception apparatus included in FIG. 1.

FIG. 2 shows a typical structure of the reception apparatus 12 included in FIG. 1.

The reception apparatus 12 includes a control block 31, a light reception block 32, a tuner 33, a demultiplexing block 34, a video decoder 35, a composition block 36, a display device 37, an audio decoder 38, speakers 39, a data broadcast control block 40, an AIT acquisition block 41, an application control block 42, and a communication interface 43.

The control block 31 controls the performance of the components making up the reception apparatus 12. The light reception block 32 receives commands from the remote controller 12R and forwards them to the control block 31. In response to the commands from the light reception block 32, the control block 31 controls the components of the reception apparatus 12 in operation.

The tuner 33 receives and demodulates the broadcast signal corresponding to the channel selected by the user's operations, acquires a transport stream (called the TS hereunder) from the demodulated broadcast signal, and supplies the acquired TS to the demultiplexing block 34.

The demultiplexing block 34 demultiplexes the TS fed from the tuner 33 into a video elementary stream, an audio elementary stream, and a data stream. Upon demultiplexing, the demultiplexing block 34 supplies the video elementary stream to the video decoder 35, audio elementary stream to the audio decoder 38, and data stream to the data broadcast control block 40.

Also multiplexed in the TS are an AIT section elementary stream, a DSM-CC (Digital Storage Media Command and Control) event message elementary stream, and a control information stream in addition to the above-mentioned streams. In the case of MPEG2-TS (Moving Picture Experts Group 2-Transport Stream), the control information stream includes information such as PSI/SI. The PSI (Program Specific Information) is information needed by the system in selectively receiving a specific channel. The SI (Service Information) is information such as TV program information including EIT, for example. The EIT (Event Information Table) includes such program-related information as program names, broadcast dates and times, and descriptions of the programs.

The video decoder 35 decodes the video elementary stream fed from the demultiplexing block 34, acquires a video signal from the stream, and feeds the acquired video signal to the composition block 36. The composition block 36 supplies the display device 37 with the video signal fed from the video decoder 35. Given the video signal, the display device 37 displays pictures of the TV program, etc.

The audio decoder 38 decodes the audio elementary stream fed from the demultiplexing block 34, acquires an audio signal from the stream, and feeds the acquired audio signal to the speakers 39. Given the audio signal, the speakers 39 output the sounds corresponding to the pictures of the TV program, etc.

The data broadcast control block 40 extracts data broadcast data from the data stream fed from the demultiplexing block 34 and controls the performance of a data broadcast application program (called the data broadcast application hereunder) accordingly. For example, if the data broadcast application is composed of a BML document, the data broadcast control block 40 controls a BML browser to feed the video signal corresponding to the data broadcast application to the composition block 36.

The composition block 36 is supplied with the video signal from the video decoder 35 and with the video signal from the data broadcast control block 40. The composition block 36 combines the video signal of a TV program or the like with the video signal of the data for data broadcasting, and feeds the resulting composite signal to the display device 37. Given the composite signal, the display device 37 may display pictures in which the data for data broadcasting is superimposed on the TV program, for example.

The AIT acquisition block 41 continuously monitors the stream demultiplexed by the demultiplexing block 34 so as to acquire an AIT included in the AIT section elementary stream. The AIT acquisition block 41 supplies the acquired AIT to the application control block 42.

Based on the AIT fed from the AIT acquisition block 41, the application control block 42 controls the communication interface 43 to access the application server 13 via the Internet 20 and request an Internet-linked application therefrom. The communication interface 43 receives the Internet-linked application sent from the application server 13 and feeds the received application to the application control block 42. The application control block 42 controls the performance of the Internet-linked application fed from the communication interface 43. For example, if the Internet-linked application is composed of an HTML (Hypertext Markup Language) document, the application control block 42 controls an HTML browser to feed the video signal corresponding to the Internet-linked application to the composition block 36.

The composition block 36 is supplied with the video signal from the video decoder 35 and with the video signal from the application control block 42. The composition block 36 combines the video signal of a TV program or the like with the video signal of the Internet-linked application, and supplies the resulting composite signal to the display device 37. Given the composite signal, the display device 37 may display pictures in which the Internet-linked application is superimposed on the TV program, for example.

The application control block 42 can control the performance of the Internet-linked application based not only on the above-mentioned AIT but also on an event message having a specific event ID and included in the DSM-CC event message elementary stream.

The reception apparatus 12 is structured as described in the above paragraphs.

[Application Control by the First Embodiment]

Figure 3:
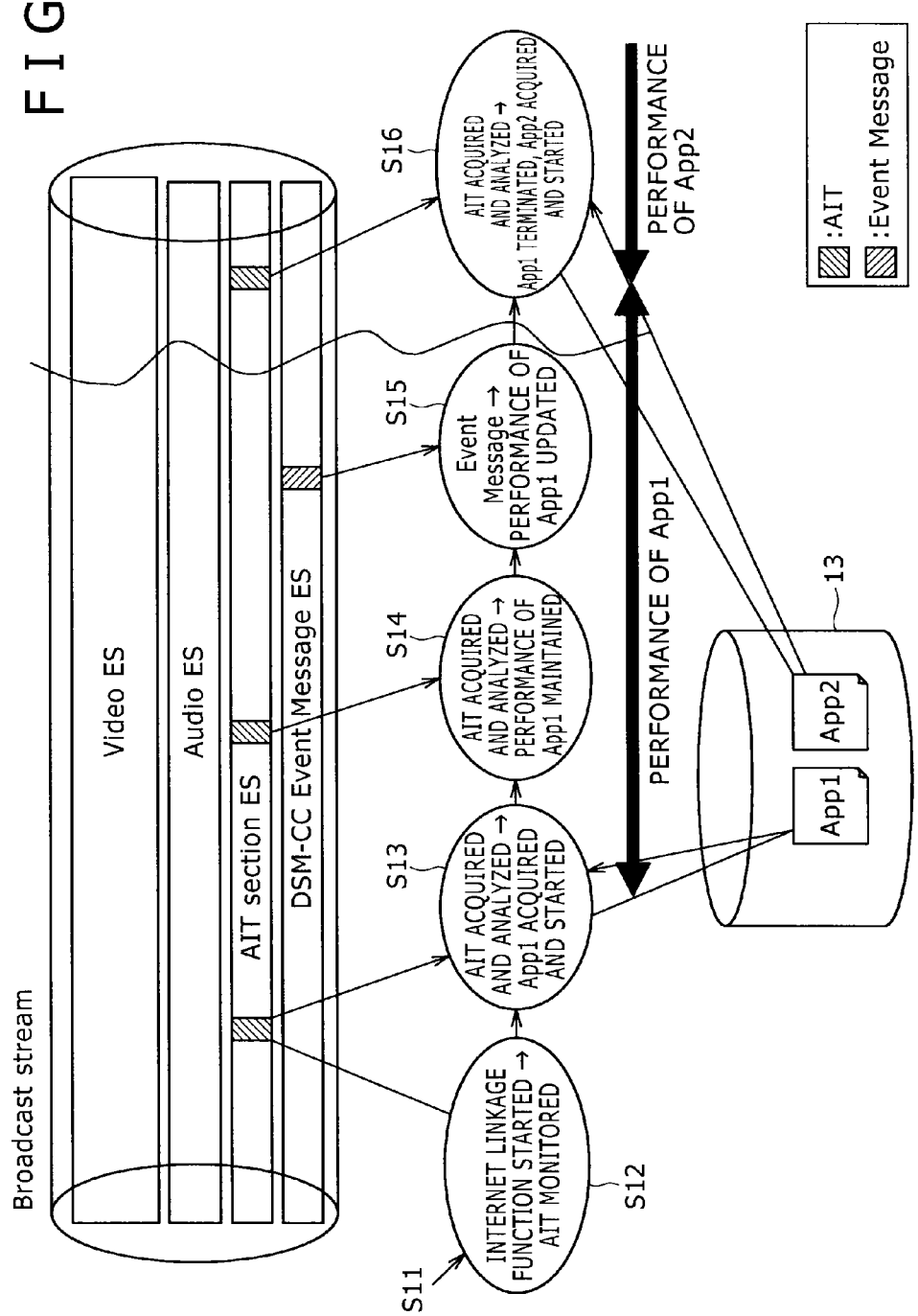
FIG. 3 is a schematic view outlining how applications are controlled by a first control method.

FIG. 3 is a schematic view outlining how applications are controlled by the first embodiment. In the ensuing description, application control by the first embodiment will be explained and referred to as application control by the first control method for the sake of distinction from application control by other embodiments.

As shown in FIG. 3, the broadcast stream is broadcast multiplexed with the video elementary stream, audio elementary stream, AIT section elementary stream, and DSM-CC event message elementary stream. Although, not shown in FIG. 3, the broadcast stream is also multiplexed with the data stream and control information stream, as discussed above.

The AIT section elementary stream includes an AIT that describes the definition information defining the life cycle of an Internet-linked application. The reception apparatus 12 acquires the AIT from the AIT section elementary stream, and controls the performance of the Internet-linked application in accordance with the definition information described in the acquired AIT.

The DSM-CC event message elementary stream includes an event message. The reception apparatus 12 acquires an event message having a specific event ID from the DSM-CC event message elementary stream, and controls the performance of the Internet-linked application in accordance with the acquired event message.

That is, as shown in FIG. 3, the user first operates the "i" button on the remote controller 12R of the reception apparatus 12 (step S11). The operation starts up the Internet linkage function of the apparatus that starts monitoring for an AIT that may be included in the AIT section elementary stream (step S12). Upon detecting an AIT, the reception apparatus 12 acquires and analyzes the AIT (step S13). Based on the result of the AIT analysis, the reception apparatus 12 acquires an Internet-linked application App1 from the application server 13 via the Internet 20 and starts the acquired application. That is, this AIT has "Auto Start" described therein as the definition information about the Internet-linked Application App1.

Thereafter, if a new AIT is detected, the reception apparatus 12 acquires and analyzes the AIT (step S14). Based on the result of the AIT analysis, the reception apparatus 12 maintains the performance of the Internet-linked application App1. That is, the newly acquired AIT either contains the same definition information as that in the previously acquired AIT or has no definition information described therein about the Internet-linked application App1.

Thereafter, upon detection of an event message having a specific event ID from the DSM-CC event message elementary stream, the reception apparatus 12 updates the performance of the Internet-linked application App1 in accordance with the event message (step S15).

Thereafter, on detecting a new AIT, the reception apparatus 12 acquires and analyzes the AIT (step S16). Based on the result of the AIT analysis, the reception apparatus 12 terminates the performance of the Internet-linked application App1. Also on the basis of the result of the AIT analysis, the reception apparatus 12 acquires an Internet-linked application App2 from the application server 13 via the Internet 20 and starts the acquired application App2. That is, this AIT has "Kill" described therein as the definition information about the Internet-linked application App1 and has "Auto Start" described therein as the definition information about the Internet-linked application App2.

Consider, for example, a situation where the broadcast of a first TV program is terminated and the broadcast of a second TV program is started on the same channel. In this case, the end of the broadcast of the first TV program brings about termination of the Internet-linked application App1 that was executed in linkage with the first TV program. Meanwhile, the start of the broadcast of the second TV program triggers a start of the Internet-linked application App2 to be carried out in linkage with the second TV program. It may be noted that Internet-linked applications can be changed not only when one TV program is succeeded by another as explained above but also at specific timings such as when a particular scene is reached during the same TV program.

Thus, under application control by the first control method, the performance of Internet-linked applications is controlled in accordance with the definition information defining the life cycle of each application, such as "Auto Start" and "Kill" described in AIT's included in the AIT section elementary stream.

[Application Control Process in Accordance with the First Control Method]

Figure 4:
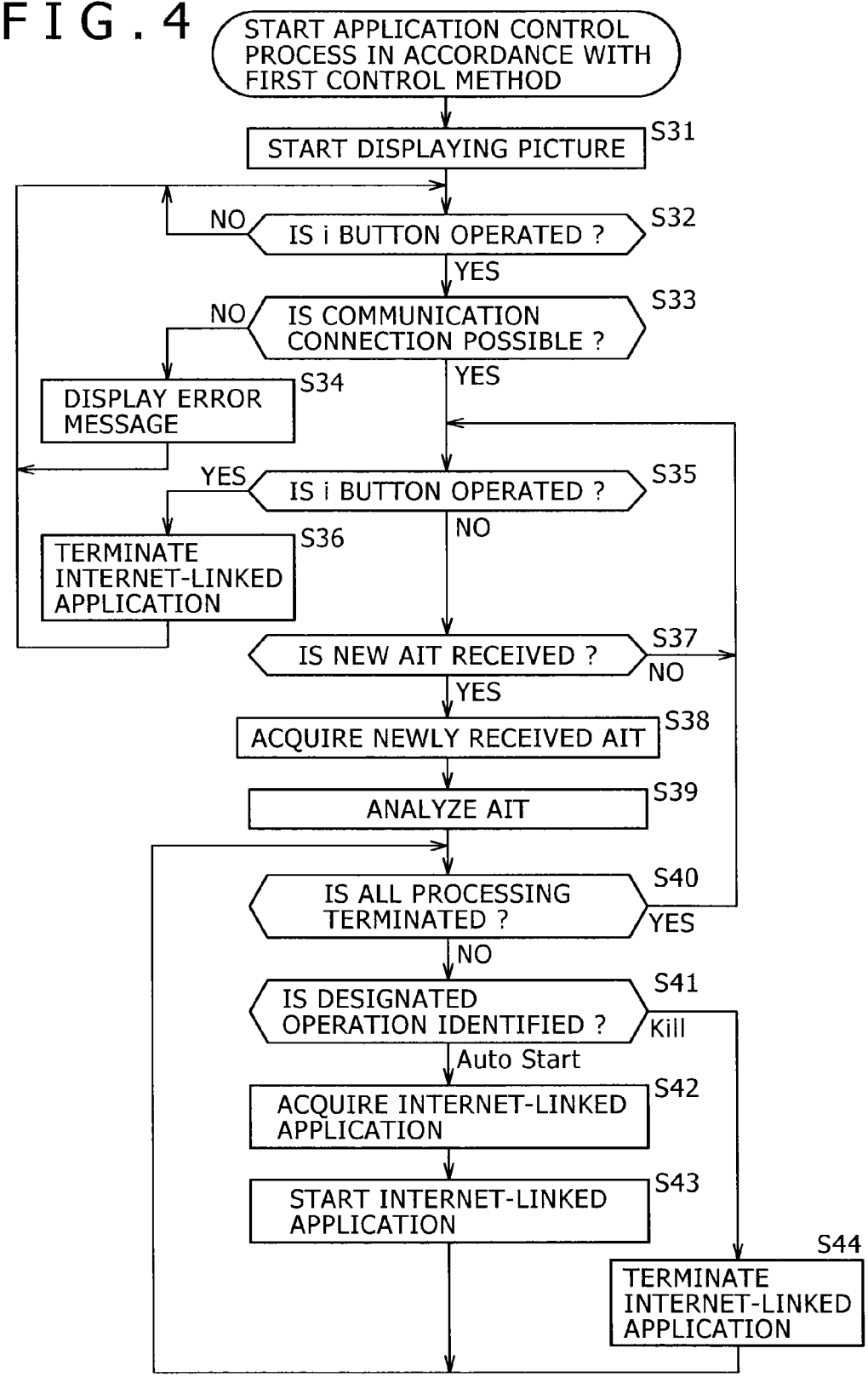
FIG. 4 is a flowchart showing an application control process performed in accordance with the first control method.

Explained below in reference to the flowchart of FIG. 4 is an application control process performed in accordance with the first control method.

When the user has operated the remote controller 12R of the reception apparatus 12 to select a desired channel, the display device 37 starts displaying the picture of the selected TV program (step S31).

In step S32, in response to a command from the remote controller 12R, the control block 31 determines whether the user has operated the "i" button. If it is determined that the "i" button is operated, control is passed to step S33.

In step S33, the control block 31 verifies the communication status of the communication interface 43 to determine whether communication connection to the Internet 20 is possible. If in step S33 it is determined that communication connection to the Internet 20 has failed, control is passed to step S34. In step S34, the control block 31 causes the display device 37 to display an error message saying that communication connection has failed. Control is then returned to step S32 and the subsequent steps are repeated.

If in step S33 it is determined that communication connection is successfully established, control is passed to step S35. In step S35, in response to a command from the remote controller 12R, the control block 31 determines whether the user has operated the "i" button.

If in step S35 it is determined that the "i" button is operated a second time after the first-time operation of the "ii" button has designated starting of an Internet-linked application, control is passed to step S36. This means that the "i" button is operated twice to designate the termination of the Internet-linked application. Accordingly, the application control block 42 terminates the currently executing Internet-linked application. Thereafter, control is returned to step S32 and the subsequent steps are repeated.

If in step S35 it is determined that the "i" button is not operated, control is passed to step S37. In step S37, the control block 31 monitors the demultiplexing of the broadcast stream by the demultiplexing block 34 to determine whether a new AIT is received.

If in step S37 it is determined that a new AIT is received, control is passed to step S38. In step S38, the AIT acquisition block 41 acquires the newly received AIT.

In step S39, the application control block 42 analyzes the AIT acquired by the AIT acquisition block 41. In step S40, the application control block 42 determines whether all processing described in the AIT has been completed. If it is determined that not all processing is completed yet, control is passed to step S41.

In step S41, based on the result of the AIT analysis in step S39, the application control block 42 identifies the designated operation defined for the Internet-linked application. If in step S41 it is determined that the designated operation of the Internet-linked application is "Auto Start," control is passed to step S42. In step S42, the application control block 42 controls the communication interface 43 to acquire the Internet-linked application from the application server 13. In step S43, the application control block 42 starts the Internet-linked application thus acquired. If in step S41 it is determined that the designated operation of the Internet-linked application is "Kill," control is passed to step S44. In step S44, the application control block 42 terminates the currently executing Internet-linked application.

Figure 5:
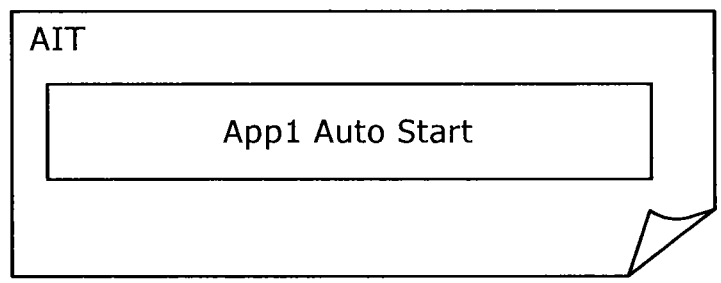
FIG. 5 is a schematic view showing a typical description of an AIT (Application Information Table)

Suppose that the AIT shown in FIG. 5 is acquired. In this case, the designated operation of the Internet-linked application App1 is defined as "Auto Start." Accordingly, the application control block 42 acquires the Internet-linked application App1 from the application server 13 and immediately starts the acquired application App1. This causes the display device 37 to display the Internet-linked application App1 in linkage with the currently viewed TV program.

Upon completion of step S43, control is returned to step S40 and the subsequent steps are repeated. In the case of the AIT in FIG. 5, only the life cycle of the Internet-linked application App1 is described. It follows that automatically starting the Internet-linked application App1 completes all processing described in the AIT. Control is then returned to step S35. Thereafter, if a new AIT is received without the "i" button being operated a second time to designate the termination of the currently executing Internet-linked application, control is passed to step S38.

Figure 6:
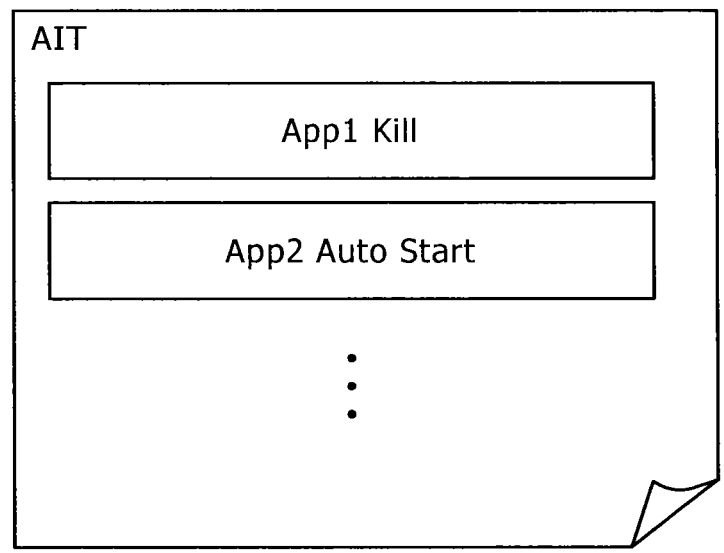
FIG. 6 is a schematic view showing another typical description of the AIT.

The AIT acquisition block 41 acquires the newly received AIT (step S38). The application control block 42 analyzes the AIT newly acquired by the AIT acquisition block 41 (step S39). Based on the result of the AIT analysis, the application control block 42 identifies the designated operation for the Internet-linked application (step S41). Suppose now that the AIT shown in FIG. 6 is acquired. In this case, the designated operation of the Internet-linked application App1 is "Kill." Accordingly, the application control block 42 terminates the currently executing Internet-linked application App1 (step S44). Because the AIT in FIG. 6 defines the designated operations for a plurality of Internet-linked applications, steps S40 through S44 are repeated in a loop. Since the designated operation of an Internet-linked application App2 is defined as "Auto Start," the application control block 42 acquires the Internet-linked application App2 and immediately starts the acquired application App2 (steps S42 and S43).

It should be noted that the description examples of the AIT in FIGS. 5 and 6 are not limitative of how the AIT is to be described; the AIT may be described in any other suitable manner.

Thereafter, steps S40 through S44 are repeated in a loop until all processing described in the AIT comes to an end. In step S35 reached upon exit from the above loop, if it is determined that a new AIT is received, the performance of the Internet-linked application is controlled in accordance with what is described in the AIT until it is determined that the "i" button is operated a second time. If in step S35 it is determined that the "i" button is operated a second time, the Internet-linked application is terminated.

The preceding paragraphs discussed the application control process performed in accordance with the first control method. In the application control process carried out by the first control method, the AIT transmitted as part of the broadcast stream is acquired. If the designated operation defined in the acquired AIT is "Auto Start," the corresponding Internet-linked application is acquired and started. If the designated operation is defined as "Kill," the corresponding Internet-linked application is terminated.

That is, in the application control process performed in accordance with the first control method, the AIT transmitted as part of the broadcast signal is acquired dynamically in linkage with the ongoing TV program. Thus, with the description of the AIT linked to the progress of the TV program, it is possible to change from a first Internet-linked application to a second Internet-linked application at such timings as when the current TV program is succeeded by another or when a specific scene is reached during the same TV program. This feature allows the broadcasting system 1 that offers hybrid broadcasting to provide Internet-linked applications that may be executed in linkage with TV programs viewed on the reception apparatus 12.

<Second Embodiment>
[Typical Configuration of the Broadcasting System]

Figure 7:
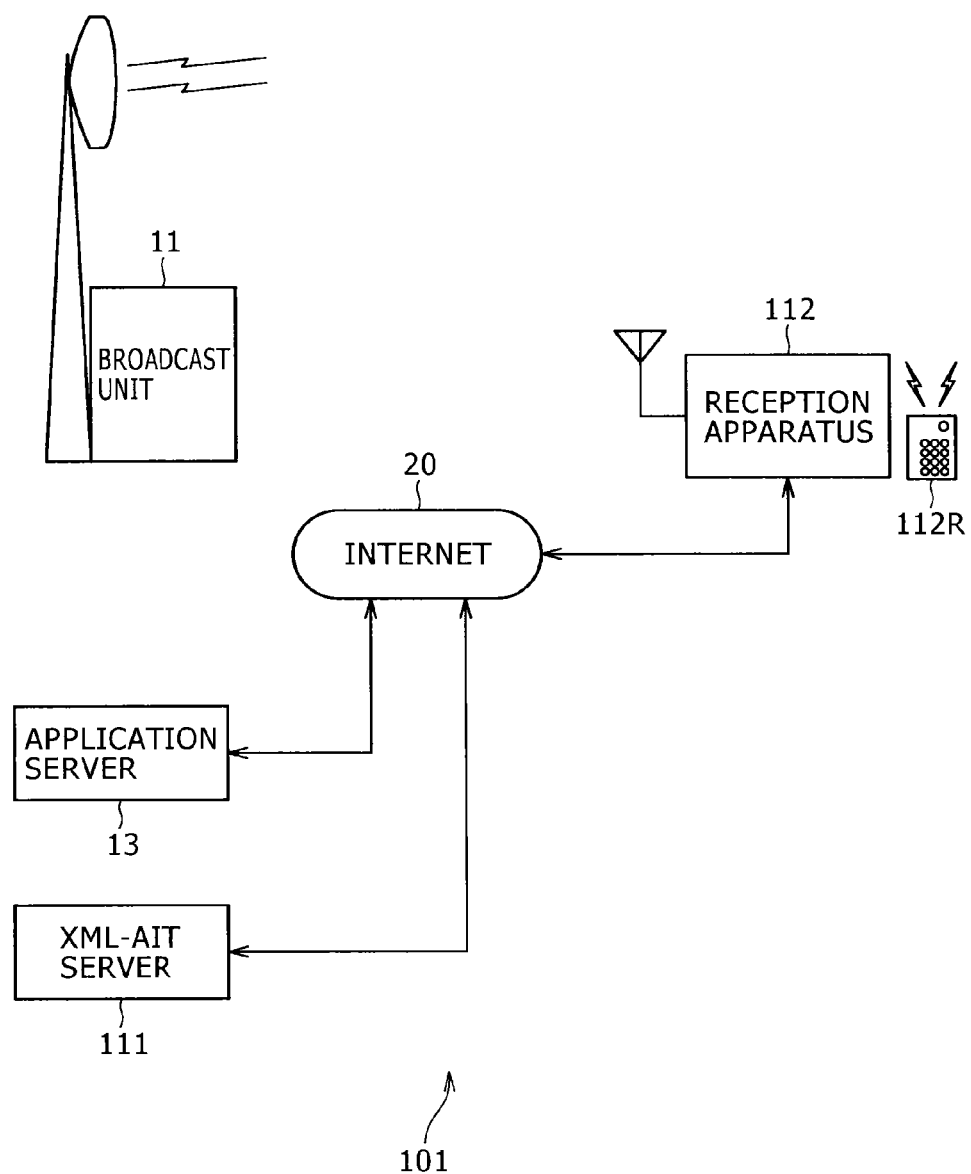
FIG. 7 is a schematic view showing a typical configuration of a broadcasting system as a second embodiment of this disclosure.

FIG. 7 shows a typical configuration of a broadcasting system 101 as the second embodiment of this disclosure. The broadcasting system 101 includes a broadcast unit 11, an application server 13, an XML-AIT server 111, and a reception apparatus 112. The reception apparatus 112, application server 13, and XML-AIT server 111 are interconnected via the Internet 20.

As shown in FIG. 7, the broadcasting system 101 differs from the broadcasting system 1 of FIG. 1 in that the XML-AIT server 111 is newly configured and that the reception apparatus 112 replaces the reception apparatus 12. The remaining configuration of the broadcasting system 101 is basically the same as that of the broadcasting system 1 in FIG. 1 and thus will not be discussed further.

The XML-AIT server 111 manages XML-AIT's (Extensible Markup Language-Application Information Table). For example, the XML-AIT server 111 may be provided by broadcasting organizations or the like broadcasting TV programs using the broadcast unit 11. In response to queries from the reception apparatus 112, the XML-AIT server 111 provides the XML-AIT's under its management to the reception apparatus 112 via the Internet 20.

With the second embodiment, the definition information is described in an XML-AIT. For example, the definition information described in the XML-AIT defining the life cycle of an Internet-linked application may include descriptions in XML of designated operations such as "Auto Start," "Present," and "Kill." The designated operations described in the XML-AIT such as "Auto Start" have the same meaning as those described in the definition information of the above-mentioned AIT. However, it should be noted that only "Auto Start" is described as the designated operation in the definition information for the performance of the second embodiment.

The reception apparatus 112 is basically structured the same as the reception apparatus 12 in FIG. 1, except that the definition information is acquired not from the AIT but from the XML-AIT. That is, the reception apparatus 112 acquires an XML-AIT by accessing the XML-AIT server 111 via the Internet 20. Based on the definition information described in the acquired XML-AIT, the reception apparatus 112 may acquire and execute an Internet-linked application that is set to be executed immediately and automatically, for example.

Also, the reception apparatus 112 controls the performance of the Internet-linked application in response to an event message having a specific event ID and included in the DSM-CC event message elementary stream as part of the broadcast stream.

The broadcasting system 101 is configured as descried in the above paragraphs.

[Typical Structure of the Reception Apparatus]

Figure 8:
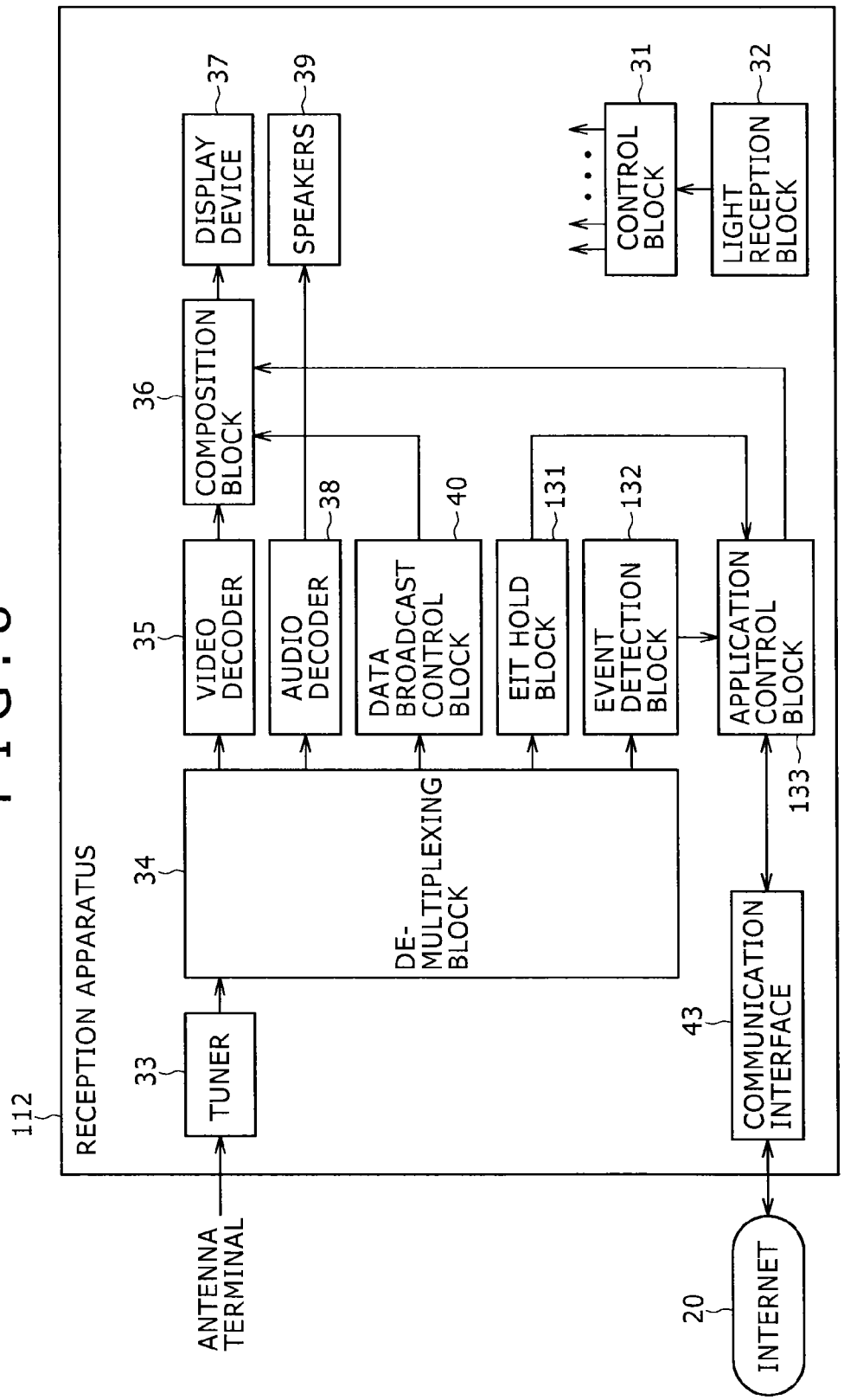
FIG. 8 is a block diagram showing a typical structure of a reception apparatus included in FIG. 7.

FIG. 8 shows a typical structure of the reception apparatus 112 included in FIG. 7.

The reception apparatus 112 includes a control block 13, a light reception block 32, a tuner 33, a demultiplexing block 34, a video decoder 35, a composition block 36, a display device 37, an audio decoder 38, speakers 39, a data broadcast control block 40, a communication interface 43, an EIT hold block 131, an event detection block 132, and an application control block 133.

As shown in FIG. 8, the reception apparatus 112 differs from the reception apparatus 12 in FIG. 2 in that the EIT hold block 131, event detection block 132, and application control block 133 is provided in place of the AIT acquisition block 41 and application control block 42. The remaining structure of the reception apparatus 112 is basically the same as that of the reception apparatus 12 in FIG. 2 and thus will not be discussed further.

The EIT hold block 131 continuously monitors the stream demultiplexed by the demultiplexing block 34 to acquire an EIT pf included in the control information stream and holds the acquired EIT pf. As mentioned above, the EIT pf includes program-related information such as the names of TV programs. The acronym "pf" is formed from the initial letters of "present" and "following" and signifies that this EIT includes information about the current and the next TV programs.

The event detection block 132 continuously monitors the stream demultiplexed by the demultiplexing block 34 so as to detect an event message having a specific event ID and included in the DSM-CC event message elementary stream. On detecting an event message, the event detection block 132 notifies the application control block 133 thereof.

The application control block 133 reads the EIT pf held by the EIT hold block 131. Based on the URL described in the EIT pf, the application control block 133 controls the communication interface 43 to access the XML-AIT server 111 via the Internet 20 and request an XML-AIT from the XML-AIT server 111. The communication interface 43 receives the XML-AIT sent from the XML-AIT server 111 and feeds the received XML-AIT to the application control block 133.

Also, based on the XML-AIT fed from the communication interface 43, the application control block 133 controls the communication interface 43 to access the application server 13 via the Internet 20 and acquire an Internet-linked application from the application server 13. The application control block 133 proceeds to control the performance of the Internet-linked application acquired from the application server 13.

Furthermore, when notified by the event detection block 132 that an event message has been detected, the application control block 133 controls the communication interface 43 to access the XML-AIT server 111 via the Internet 20 and acquire the XML-AIT about a second Internet-linked application to be executed next to the currently executing first Internet-linked application. Based on the newly acquired XML-AIT, the application control block 133 acquires the second Internet-linked application from the application server 13 and controls the performance of the acquired application.

The reception apparatus 112 is structured as described in the above paragraphs.

[Application Control by the Second Embodiment]

Figure 9:
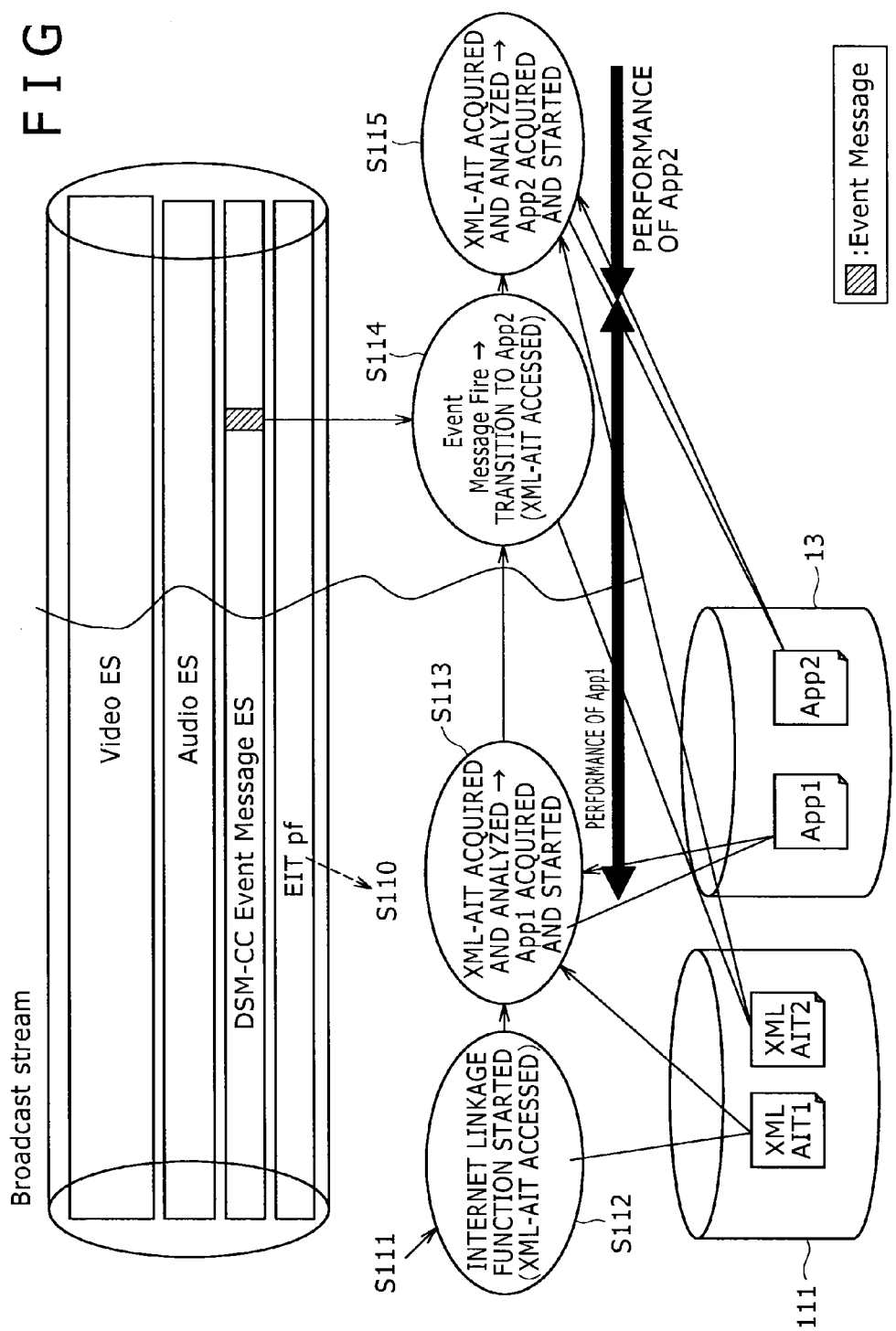
FIG. 9 is a schematic view outlining how applications are controlled by a second control method.

FIG. 9 is a schematic view outlining how applications are controlled by the second embodiment. In the ensuing description, application control by the second embodiment will be explained and referred to as application control performed in accordance with the second control method.

As shown in FIG. 9, the broadcast stream is broadcast multiplexed with a video elementary stream, an audio elementary stream, a DSM-CC event message elementary stream, and a control information stream. The control information stream includes the EIT pf.

As indicated in FIG. 9, upon receipt of an EIT pf, the reception apparatus 112 holds the received EIT pf (step S110). When the user has operated the "i" button on a remote controller 112R (step S111), the reception apparatus 112 starts its own Internet linkage function (step S112) and reads the EIT pf held in step S110.

The reception apparatus 112 accesses the XML-AIT server 111 in accordance with the URL described in the EIT pf, acquires an XML-AIT1, and analyzes the acquired XML-AIT1 (step S113). Based on the result of the XML-AIT1 analysis, the reception apparatus 112 acquires an Internet-linked application App1 from the application server 13 via the Internet 20 and starts the acquired application App1. That is, this XML-AIT1 has "Auto Start" described therein as the definition information about the Internet-linked application App1, for example.

Thereafter, on detecting an event message included in the DSM-CC event message elementary stream, the reception apparatus 112 accesses the XML-AIT server 111 in accordance with the event message (step S114). The reception apparatus 112 acquires an XML-AIT2 from the XML-AIT server 111 and analyzes the acquired XML-AIT2 (step S115). Based on the result of the XML-AIT2 analysis, the reception apparatus 112 acquires an Internet-linked application App2 from the application server 13 via the Internet 20 and starts the acquired application App2. That is, this XML-AIT2 also has "Auto Start" described therein as the definition information about the Internet-linked application App2, for example.

In the manner described above, at a predetermined timing such as when a first TV program is succeeded by a second TV program on the same channel, the Internet-linked application App1 is terminated and the Internet-linked application App2 is started in its place.

Thus, under application control by the second control method, an XML-AIT is acquired from the linked XML-AIT server 111 in keeping with the user's operation or an event message. In accordance with the definition information such as "Auto Start" described in the XML-AIT defining the life cycle of an Internet-linked application, the Internet-linked application is acquired from the application server 13 and the performance of the acquired application is controlled.

[Application Control Process in Accordance with the Second Control Method]

Figure 10:
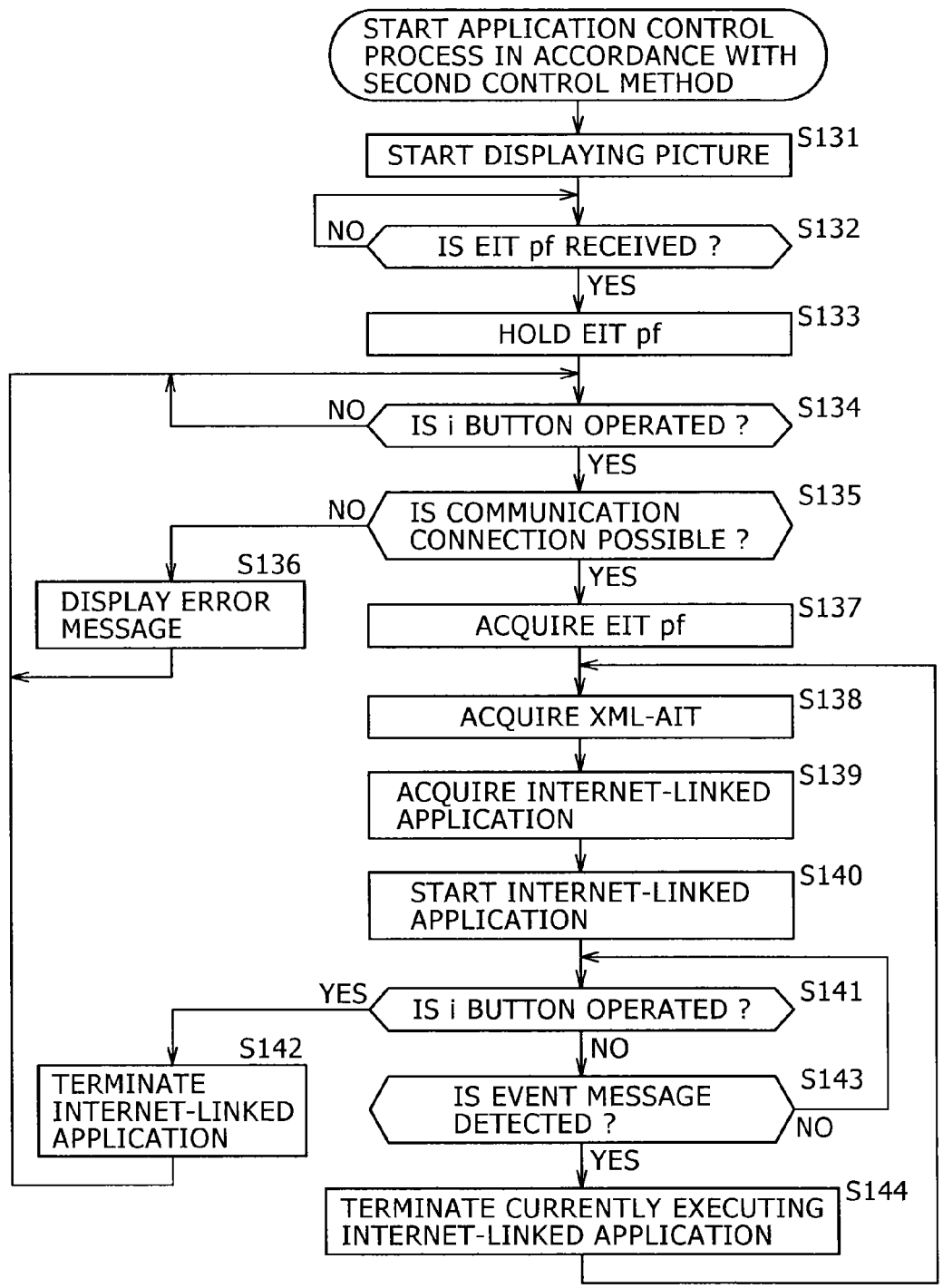
FIG. 10 is a flowchart showing an application control process performed in accordance with the second control method.

Explained below in reference to the flowchart of FIG. 10 is an application control process performed in accordance with the second control method.

When the user has performed operations on the reception apparatus 112 to select a desired channel, the display device 37 starts displaying the picture of the selected TV program (step S131).

In step S132, the control block 31 determines whether an EIT pf is received by monitoring the demultiplexing of the broadcast stream by the demultiplexing block 34. Upon receipt of an EIT pf, control is passed to step S133.

In step S133, the EIT hold block 131 acquires the EIT pf included in the control information stream and holds the acquired EIT pf. Since the EIT pf is received basically at the same time that a TV program is started, it is possible to hold the EIT pf before the user operates the "i" button.

In steps S134 through S136, as in steps S32 through S34 of FIG. 4, the control block 31 monitors the operating status of the "i" button as well as communication status. If it is determined that the "i" button is operated and that communication connection is possible, control is passed to step S137.

In step S137, the application control block 133 acquires the EIT pf held by the EIT hold block 131. In step S138, the application control block 133 accesses the XML-AIT server 111 based on the URL described in the acquired EIT pf so as to obtain an XML-AIT.

Figures 11, 12:
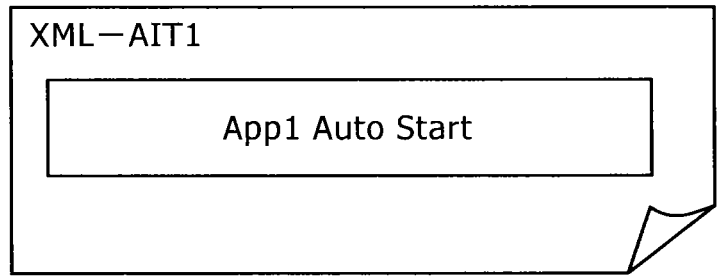
FIG. 11 is a schematic view showing a description example of a hyperlink descriptor.
FIG. 12 is a schematic view showing a description example of an XML-AIT (Extensible Markup Language-Application Information Table)

FIG. 11 is a schematic view showing a description example of a hyperlink descriptor included in the EIT pf.

The hyperlink descriptor (described as "hyperlink_descriptor") is used to describe other TV programs, program descriptions, and links to program-related information.

An element "descriptor_tag" in the hyperlink descriptor describes the tag value assigned to this descriptor. An element "descriptor_length" describes the descriptor length of this descriptor.

An element "hyper_linkage_type" designates the type of linkage. For example, if "0x08" is designated, it indicates that there exists a link to an Internet-linked application. An element "link_destination_type" designates the type of the link destination. For example, if "0x08" is designated, it indicates a specific content on the Internet 20.

If, say, "0x08" is designated in the elements "hyper_linkage_type" and "link_destination_type," an element "selector_byte" describes the URL of the XML-AIT server 111 as information designating the destination from which to acquire the XML-AIT of the corresponding Internet-linked application. It should be noted that a host name, path name or the like is described in this element, not scheme names such as "http://."

That is, the application control block 133 acquires the XML-AIT by accessing the XML-AIT server 111 based on the URL described in the element "selector_byte" of the hyperlink descriptor.

The hyperlink descriptor is described as explained in the above paragraphs. It should be noted that the description example in FIG. 11 is not limitative of how the hyperlink descriptor is to be described; the hyperlink-descriptor may be described in any other suitable manner.

Returning to the flowchart of FIG. 10, in step S139, the application control block 133 controls the communication interface 43 to acquire an Internet-linked application from the application server 13. In step S140, the application control block 133 starts the acquired Internet-linked application.

Suppose that the XML-AIT1 in FIG. 12 is acquired, for example. In this case, the designated operation of the Internet-linked application App1 is "Auto Start," so that the application control block 133 acquires the Internet-linked application App1 from the application server 13 and immediately executes the acquired application App1. This causes the display device 37 to display the Internet-linked application App1 in linkage with the currently viewed TV program.

It should be noted that the description example in FIG. 12 is not limitative of how the XML-AIT is to be described; the XML-AIT may be described in any other suitable manner.

Upon completion of step S140, control is passed to step S141. In steps S141 and S142, as in steps S35 and S36 of FIG. 4, the control block 31 monitors the operating status of the "i" button. If it is determined that the "i" button is again operated by the user, that means the termination of the Internet-linked application is designated. In that case, the currently executing Internet-linked application is terminated.

On the other hand, if it is determined that the "i" button is not operated again by the user, control is passed to step S143.

In step S143, the event detection block 132 monitors the demultiplexing process on the broadcast stream by the demultiplexing block 34 so as to determine whether an event message having a specific event ID is detected. If in step S143 it is determined that the specific event message is not detected, control is returned to step S141 and the determination process of steps S141 and S143 is repeated.

If in step S143 it is determined that the specific event message is detected, control is passed to step S144. Given notification from the event detection block 132, the application control block 133 terminates the currently executing Internet-linked application. Upon completion of step S144, control is returned to step S138 and the subsequent steps are repeated.

That is, in response to the notification from the event detection block 132, the application control block 133 accesses the XML-AIT server 111 and acquires a new XML-AIT (step S138). With the new XML-AIT acquired, the application control block 133 accesses the application server 13 accordingly to acquire a new Internet-linked application (step S139) and starts the newly acquired Internet-linked application (step S140). This is how the new Internet-linked application is carried out. Preferably, the process of step S144 may be performed here to terminate the previously started Internet-linked application after the new Internet-linked application has been started.

Figure 13:
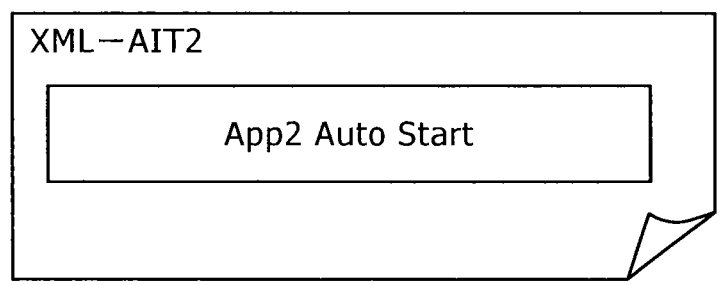
FIG. 13 is a schematic view showing another description example of the XML-AIT.

For example, suppose that the currently executing Internet-linked application App1 has a script described therein for making transition to an Internet-linked application App2 upon detection of a specific event message. In such a case, given notification from the event detection block 132, the application control block 133 accesses the XML-AIT server 111 to acquire the XML-AIT 2 shown in FIG. 13. When the application control block 133 designates XML-AIT2 as an argument in, say, a Create Application function and executes the function, the Internet-linked application App2 is acquired from the application server 13 and started. As a result, the currently executing Internet-linked application App1 for the first TV program is replaced with the Internet-linked application App2 for a second TV program.

In this manner, at predetermined timings such as when the first TV program is succeeded by the second TV program on the same channel, a specific event message is detected and the Internet-linked application App1 is replaced with the Internet-linked application App2 accordingly.

Steps S138 through S141 and S143 are then repeated until the "i" button is again operated by the user in step S141 to designate the termination of the Internet-linked application.

The preceding paragraphs explained application control by the second control method. With application control in effect in accordance with the second control method, a first XML-AIT is acquired from the XML-AIT server 111 and a first Internet-linked application is acquired and started based on the EIT pf. If a predetermined event message is detected, a second XML-AIT is acquired from the XML-AIT server 111, a second Internet-linked application is acquired and started, and the currently executing first Internet-linked application is terminated.

That is, under application control by the second control method, the XML-AIT acquired from the XML-AIT server 111 is static in nature and not linked to the progress of the TV program. Thus, depending on the XML-AIT, it may not be possible for the first Internet-linked application to recognize the end of the TV program. Under application control of this type, the detection of a predetermined event message notifies the first Internet-linked application of the end of the program, which allows the second Internet-linked application to replace the first Internet-linked application. This enables the broadcasting system 101 offering hybrid broadcasting to provide Internet-linked applications to be executed in linkage with TV programs viewed on the reception apparatus 112.

<Third Embodiment>

[Typical Configuration of the Broadcasting System]

Figure 14:
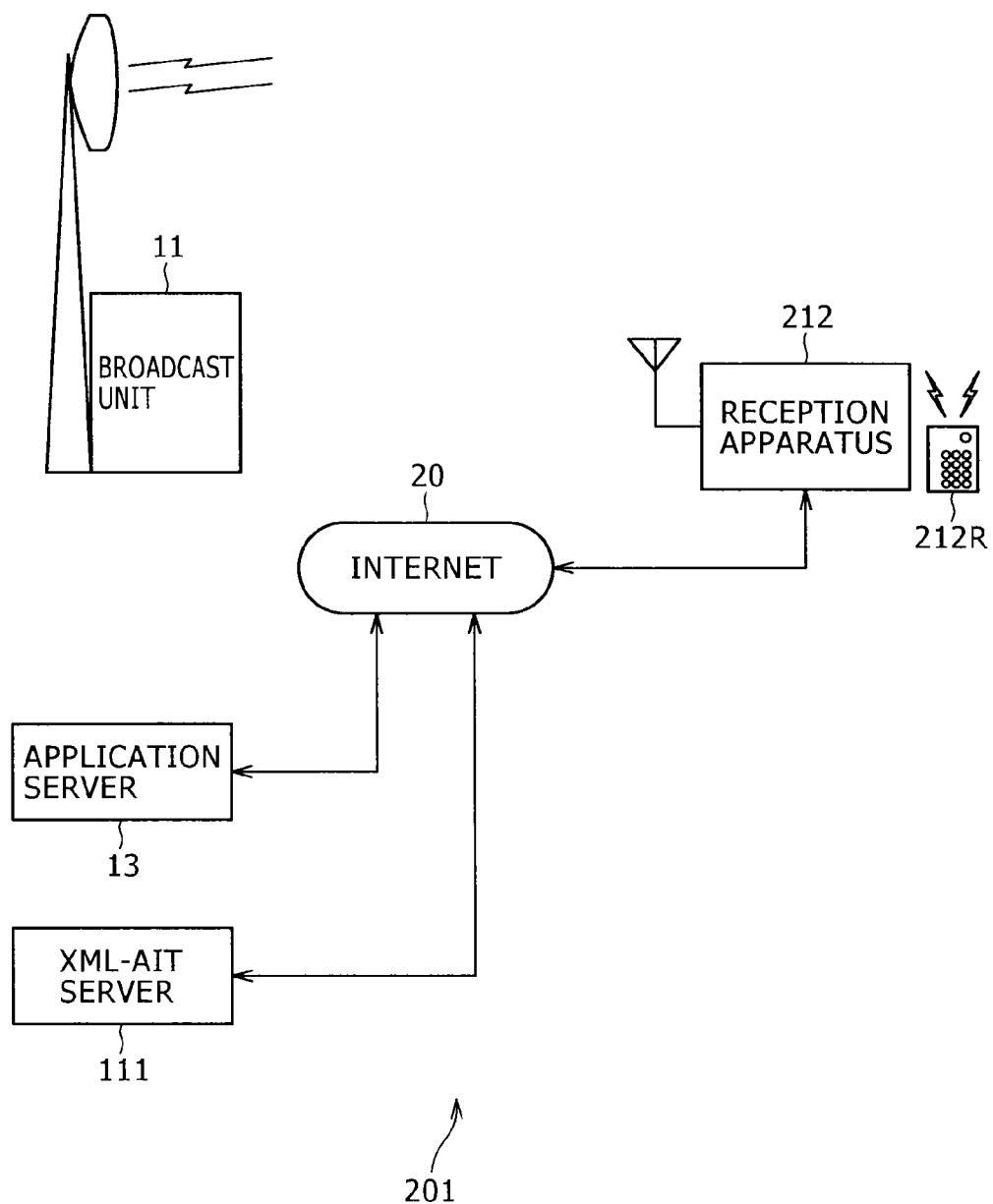
FIG. 14 is a schematic view showing a typical configuration of a broadcasting system as a third embodiment of this disclosure.

FIG. 14 shows a typical configuration of a broadcasting system 201 as the third embodiment of this disclosure. The broadcasting system 201 includes a broadcast unit 111, an application server 13, an XML-AIT server 11, and a reception apparatus 212. The reception apparatus 212, application server 13, and XML-AIT server 111 are interconnected via the Internet 20.

As shown in FIG. 14, the broadcasting system 201 differs from the broadcasting system 101 in FIG. 7 in that the reception apparatus 212 replaces the reception apparatus 112. The remaining configuration of the broadcasting system 201 is basically the same as that of the broadcasting system 101 in FIG. 7 and thus will not be discussed further.

The reception apparatus 212 is structured basically the same as the reception apparatus 112 in FIG. 7. The reception apparatus 212 accesses the XML-AIT server 111 via the Internet 20 to acquire an XML-AIT. Based on the definition information described in the acquired XML-AIT, the reception apparatus 212 may acquire and execute an Internet-linked application set to be executed immediately and automatically, for example. That is, with the third embodiment, as in the case of the second embodiment, the definition information is described in the XML-AIT.

Also, the reception apparatus 212 sets timer events that will take place at the timing of Internet-linked applications getting changed. In accordance with such timer events, the reception apparatus 212 controls the performance of Internet-linked applications.

The broadcasting system 201 is configured as described in the above paragraphs.

[Typical Structure of the Reception Apparatus]

Figure 15:
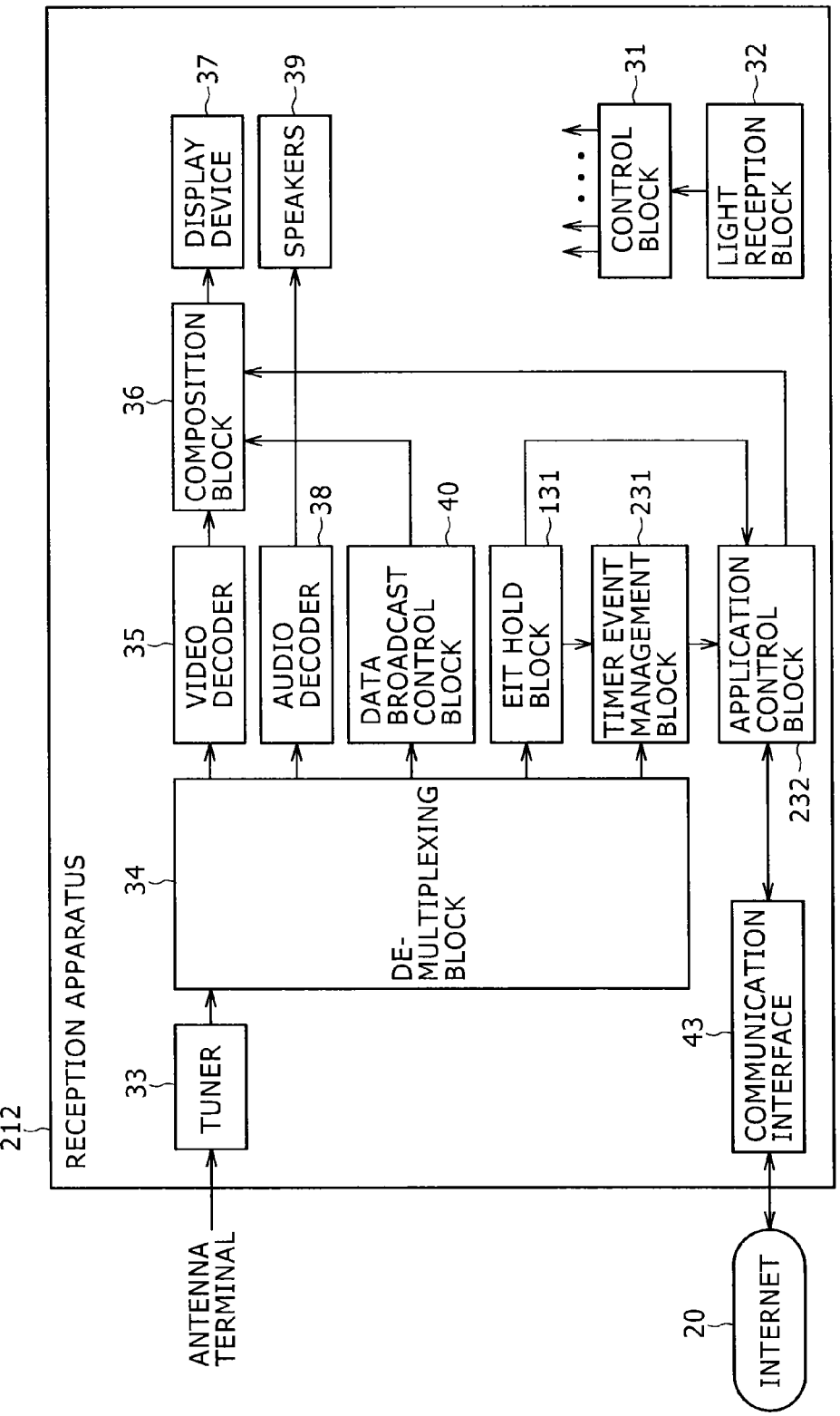
FIG. 15 is a block diagram showing a typical structure of a reception apparatus included in FIG. 14.

FIG. 15 shows a typical structure of the reception apparatus 212 included in FIG. 14.

The reception apparatus 212 includes a control block 31, a light reception block 32, a tuner 33, a demultiplexing block 34, a video decoder 35, a composition block 36, a display device 37, an audio decoder 38, speakers 39, a data broadcast control block 40, a communication interface 43, an EIT hold block 131, a timer event management block 231, and an application control block 232.

As shown in FIG. 15, the reception apparatus 212 differs from the reception apparatus 112 in FIG. 8 in that the timer event management block 231 and application control block 232 are provided to replace the event detection block 132 and application control block 133. The remaining structure of the reception apparatus 212 is basically the same as that of the reception apparatus 112 in FIG. 8 and thus will not be discussed further.

The timer event management block 231 sets a timer event that is to occur at the timing of Internet-linked applications getting changed on the basis of, say, information about the progress of the TV program included in the EIT pf held by the EIT hold block 131. When the timer event occurs, the timer event management block 231 notifies the application control block 232 thereof.

The application control block 232 reads the EIT pf held by the EIT hold block 131, and controls the communication interface 43 based on the URL described in the EIT pf to acquire an XML-AIT from the XML-AIT server 111. In accordance with the XML-AIT thus acquired, the application control block 232 controls the communication interface 43 to acquire an Internet-linked application from the application server 13 and controls the performance of the acquired application.

Also, when notified by the timer event management block 231 that the timer event has occurred, the application control block 232 controls the communication interface 43 to access the XML-AIT server 111 via the Internet 20 and acquire an XML-AIT about the second Internet-linked application to be executed following the currently executing first Internet-linked application. Based on the newly acquired XML-AIT, the application control block 232 acquires the second Internet-linked application from the application server 13 and controls the performance of the acquired application.

The reception apparatus 212 is structured as described in the above paragraphs.

[Application Control by the Third Embodiment]

Figure 16:
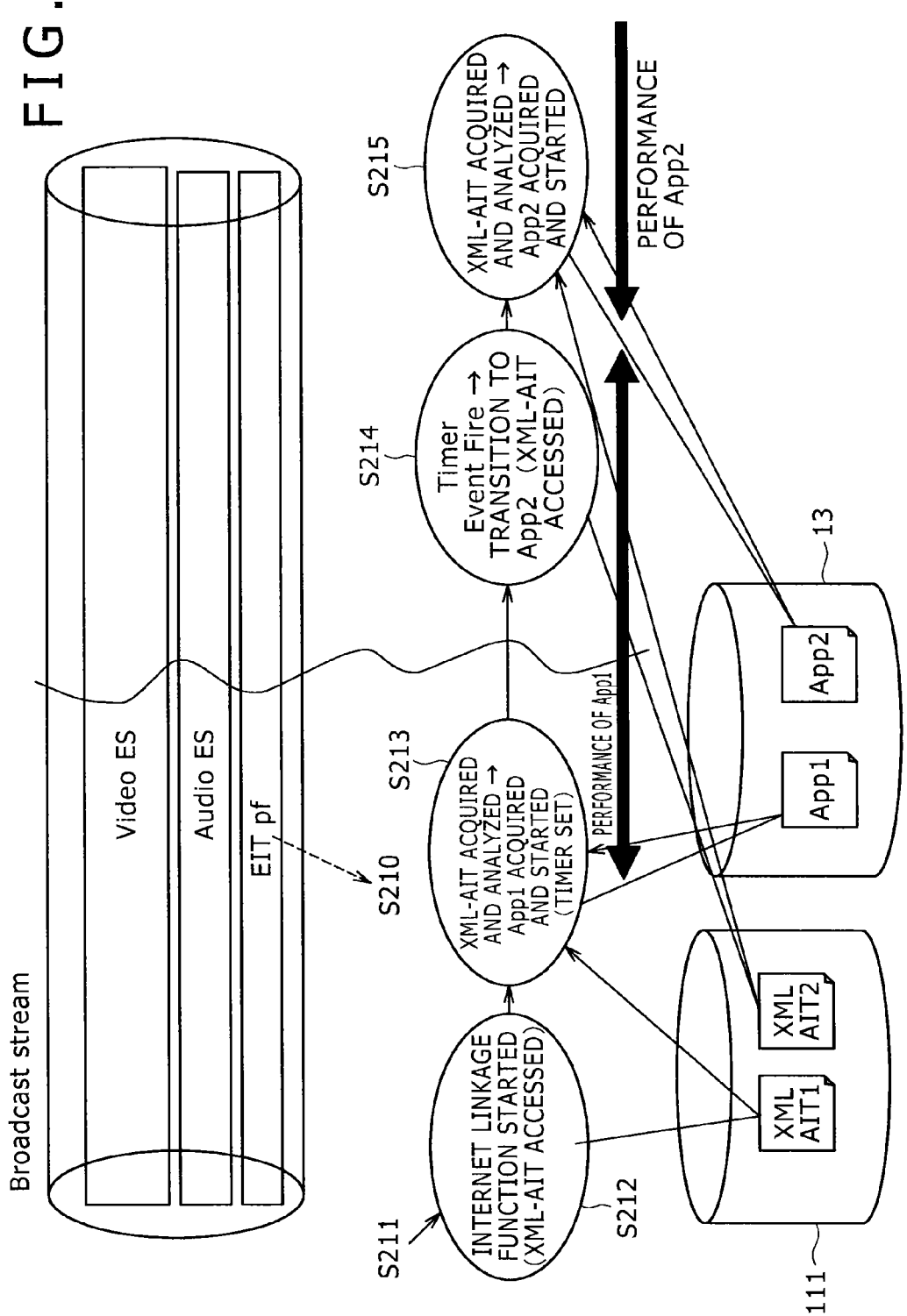
FIG. 16 is a schematic view outlining how applications are controlled by a third control method.

FIG. 16 is a schematic view showing how the broadcast stream is structured in accordance with a third control method. In the ensuing description, application control by the third embodiment will be explained and referred to as application control performed in accordance with the third control method.

As shown in FIG. 16, the broadcast stream is broadcast multiplexed with the video elementary stream, audio elementary stream, and control information stream.

As indicated in FIG. 16, upon receipt of an EIT pf, the reception apparatus 212 holds the received EIT pf (step S210). When the user operates the "i" button on a remote controller 212R (step S211), the reception apparatus 212 starts its own Internet linkage function (step S212) and reads the EIT pf held in step S210.

The reception apparatus 212 accesses the XML-AIT server 111 in accordance with the URL described in the EIT pf, acquires an XML-AIT1, and analyzes the acquired XML-AIT1 (step S213). Based on the result of the XML-AIT1 analysis, the reception apparatus 212 acquires an Internet-linked application App1 from the application server 13 via the Internet 20 and starts the acquired application App1. That is, this XML-AIT1 (e.g., XML-AIT1 in FIG. 12) has "Auto Start" described therein as the definition information about the Internet-linked application App1, for example.

The reception apparatus 212 also sets a timer event.

When a timer event takes place upon elapse of a predetermined time period, the reception apparatus 212 accesses the XML-AIT server 111 in response to that timer event (step S214). The reception apparatus 212 proceeds to acquire an XML-AIT2 from the XML-AIT server 111 and analyze the acquired XML-AIT2 (step S215). Based on the result of the XML-AIT2 analysis, the reception apparatus 212 acquires an Internet-linked application App2 from the application server 13 via the Internet 20 and starts the acquired application App2. That is, this XML-AIT2 (e.g., XML-AIT2 in FIG. 13) has "Auto Start" described therein as the definition information about the Internet-linked application App2, for example.

In this manner, at predetermined timings such as when the first TV program is changed to the second TV program on the same channel, the Internet-linked application App1 linked to the first TV program is replaced with the Internet-linked application App2 linked to the second TV program.

In the manner described above, with application control in effect in accordance with the third control method, the XML-AIT is acquired from the XML-AIT server 111 at a link destination in response to the user's operation or the timer event. The performance of the Internet-linked application is then controlled in keeping with the definition information such as "Auto Start" described in the XML-AIT about the life cycle of the Internet-linked application.

[Application Control Process in Accordance with the Third Control Method]

Figure 17:
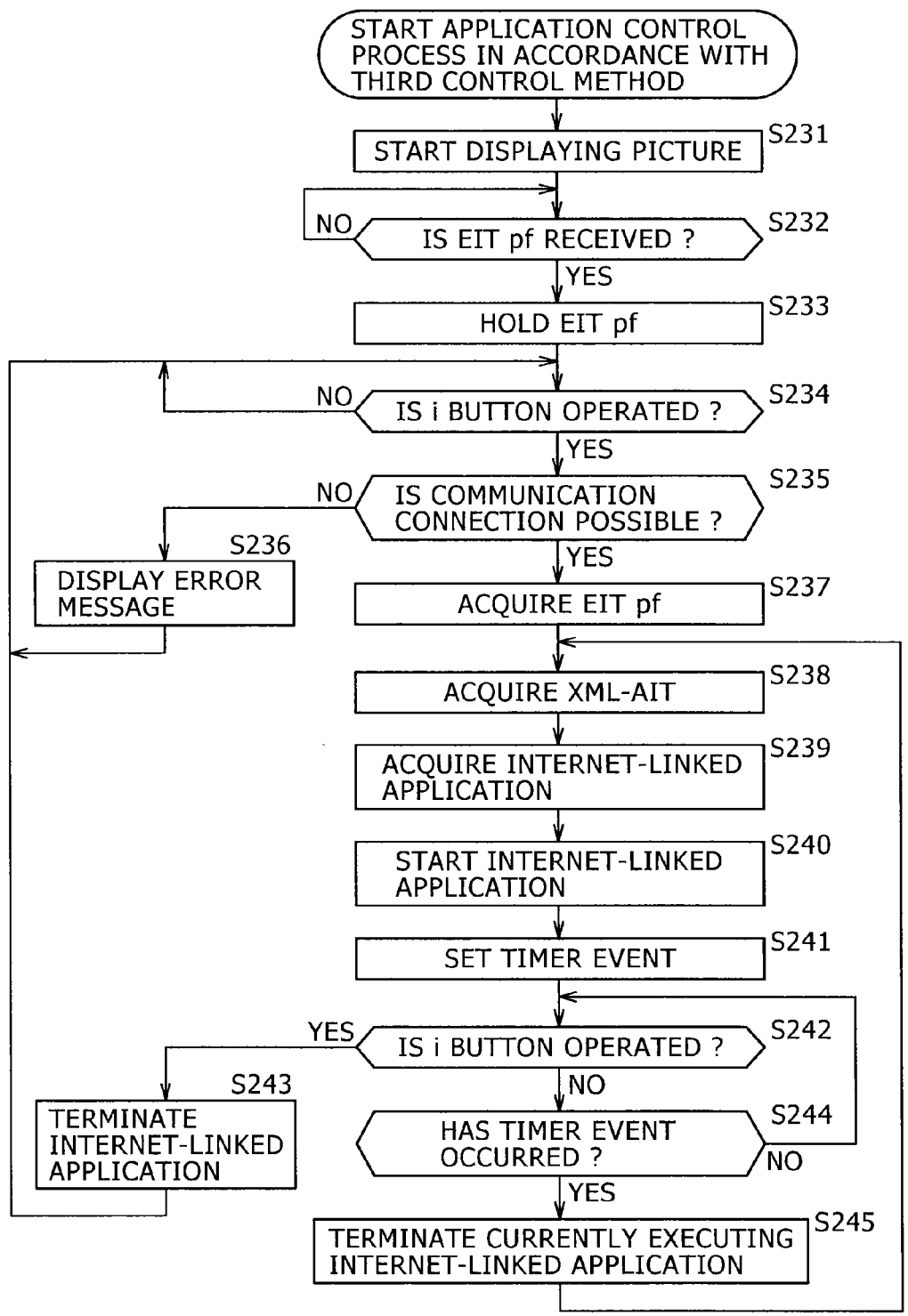
FIG. 17 is a flowchart showing an application control process performed in accordance with the third control method.

Explained below in reference to the flowchart of FIG. 17 is an application control process performed in accordance with the third control method.

In steps S231 through S240, as in steps S131 through S140 of FIG. 10, the operating status of the "i" button and communication status are monitored. If it is determined that the "i" button is operated and that communication connection is possible, the application control block 232 acquires an XML- AIT based on the EIT pf held in advance. Also, the application control block 232 acquires an Internet-linked application from the application server 13 and starts the acquired application.

In step S241, the timer event management block 231 sets a timer event. For example, the timer event management block 231 calculates the point in time at which to change Internet-linked applications using program information such as the broadcast dates and times of the TV programs included in the EIT pf, and sets the calculated time as the timer event. Specifically, $T_x$ representing the timer event set time is obtained from the following expression (1):

$$T_x = T_B + D - t_0 \qquad (1)$$

where $T_B$ stands for the start time of the currently viewed first TV program, D for the broadcast time of the first TV program, and $t_0$ for the current time.

In the expression (1) above, "$T_B+D$" coincides with the start time of the second TV program to be broadcast following the first TV program. The expression (1) is an example of the arithmetic expression for calculating the timer event set time. The set time may also be obtained using some other suitable calculating method.

Upon completion of step S241, control is passed to step S242. In steps S242 and S243, as in steps S141 and S142 of FIG. 10, the control block 31 monitors the operating status of the "i" button. If it is determined that the user has again operated the "i" button, that means the termination of the Internet-linked application is designated. In this case, the currently executing Internet-linked application is terminated.

On the other hand, if in step S242 it is determined that the user has not operated the "i" button again, control is passed to step S244.

In step S244, the timer event management block 231 determines whether a set timer event has occurred. If in step S244 it is determined that no timer event has occurred yet, control is returned to step S242, and the determination process of steps S242 and S244 is repeated.

If in step S244 it is determined that a timer event has occurred, control is passed to step S245. In steps S245 and S238 through S240, as in steps S144 and S138 through S140 of FIG. 10, the application control block 232 accesses the XML-AIT server 111 to acquire an XML-AIT 2 in response to a notification from the timer event management block 231. In accordance with the XML-AIT2 thus acquired, the application control block 232 acquires an Internet-linked application App2 from the application server 13, starts the acquired application App2, and terminates the Internet-linked application App1. That is, when the currently viewed first TV program is changed to the second TV program for example, the Internet-linked application App1 for the first TV program is also changed accordingly to the Internet-linked application App2 for the second TV program.

The foregoing paragraphs explained application control performed in accordance with the third control method. With application control in effect according to the third control method, the first XML-AIT is acquired from the XML-AIT server 111 based on the EIT pf, and the first Internet-linked application is acquired and started. If a predetermined timer event has occurred, the second XML-AIT is acquired from the XML-AIT server 111, the second Internet-linked application is acquired and started, and the currently executing first Internet-linked application is terminated.

That is, under application control by the third control method, the XML-AIT acquired from the XML-AIT server 111 is static in nature and not linked to the progress of any TV program. That means it is difficult for the first Internet-linked application to recognize the end of the TV program using the XML-AIT. Thus, a timer event is set in advance. When that timer event takes place, the first Internet-linked application recognizes the end of the ongoing TV program, which allows the second Internet-linked application to take over the first Internet-linked application. This enables the broadcasting system 201 offering hybrid broadcasting to provide Internet-linked applications to be executed in linkage with TV programs viewed on the reception apparatus 212.

[Screen Transitions in Effect when Data Broadcasting and Hybrid Broadcasting Coexist]

Figure 18:
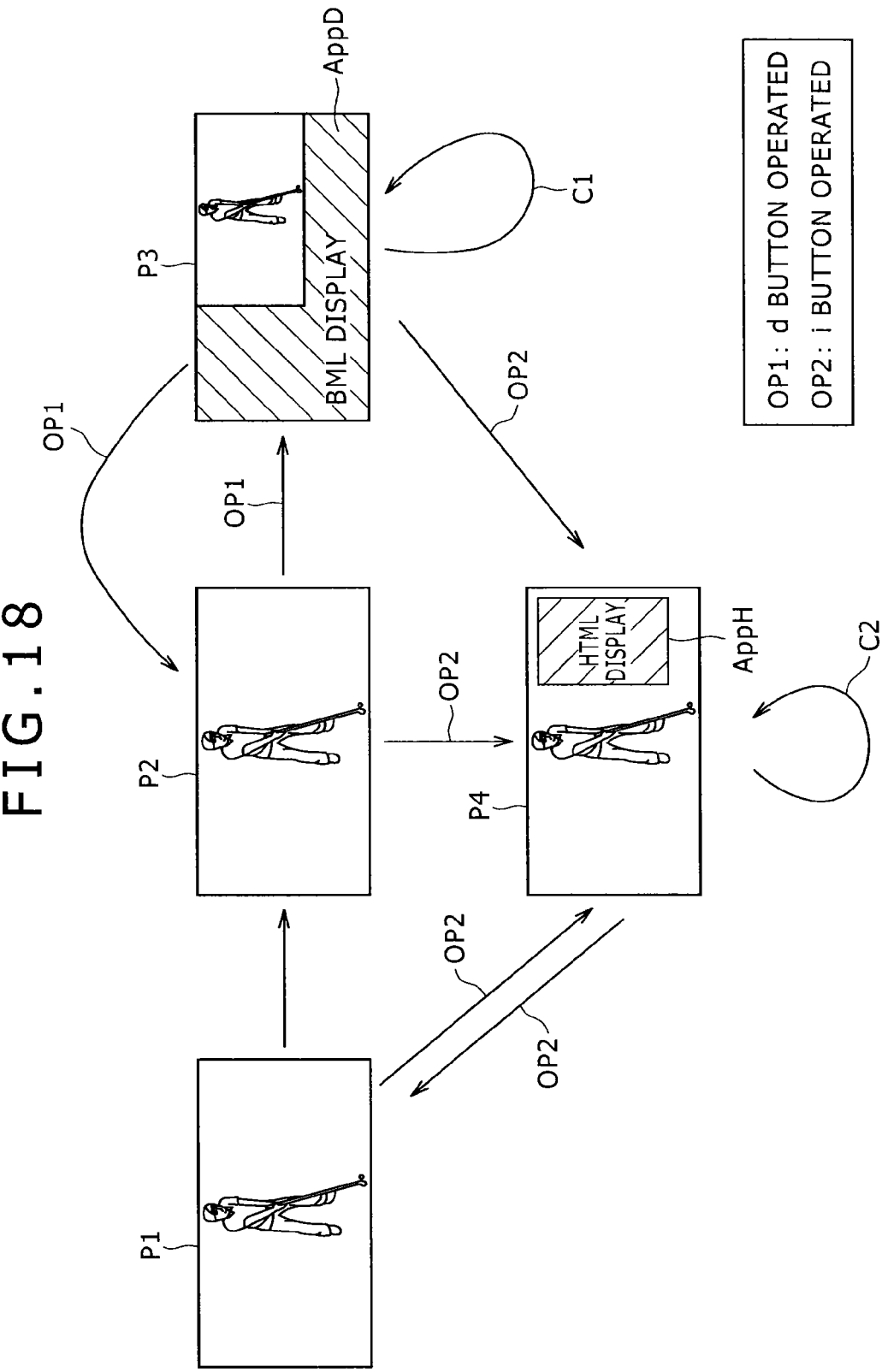
FIG. 18 is a diagram showing typical screen transitions taking place when data broadcasting and hybrid broadcasting coexist.

When application control is carried out in accordance with the above-described first through the third control methods, screen transitions such as those shown in FIG. 18 may be performed on the reception apparatuses 12, 112 and 212.

FIG. 18 is a diagram showing typical screen transitions taking place when data broadcasting and hybrid broadcasting coexist.

As shown in FIG. 18, the user may typically operate the remote controller 12R of the reception apparatus 12 or the like to select a desired channel. This causes the display unit 37 to display a picture P1 of the selected program. The reception of data broadcasting is also started, with the BML browser starting to process a data broadcast application AppD composed of a BML document. At this point, a picture P2 of the program is displayed but no picture of the data broadcast application AppD is being displayed.

If the user operates the "d" button on the remote controller 12R or the like, a picture of the data broadcast application AppD is displayed apart from a picture P3 of the program. If a predetermined data event occurs such as one of TV programs getting changed or a specific scene being reached, the displayed content of the data broadcast application AppD is changed (C1 in FIG. 18) depending on the data event in question. If the "d" button is again operated while the data broadcast application AppD is being displayed, the display of the data broadcast application AppD is terminated and the state in which only the program picture P2 is displayed is restored.

If the user operates the "i" button on the remote controller 12R or the like while the program picture P1, P2 or P3 (data broadcast application AppD) is being displayed on the display unit 37, the HTML browser starts an Internet-linked application AppH composed of an HTML document. This causes the picture of the Internet-linked application AppH to be displayed in overlaid fashion on a program picture P4.

Under application control in accordance with the first control method, as explained above, the Internet-linked application AppH is acquired and started based on the AIT obtained from the broadcast stream. On the other hand, under application control in keeping with the second or the third control method, the Internet-linked application AppH is acquired and started based on the XML-AIT obtained from the XML-AIT server 111.

At predetermined timings such as when TV programs are changed or a specific scene is reached, the display of the Internet-linked application AppH is changed. Under application control in accordance with the first control method, when a new AIT is received, the display of the Internet-linked application AppH is changed based on the newly received AIT. Under application control in keeping with the second control method, when a predetermined event message is detected, the display of the Internet-linked application AppH is changed as per the event message (C2 in FIG. 18). Under application control according to the third control method, when a predetermined timer event takes place, the display of the Internet-linked application AppH is changed as per the timer event (C2 in FIG. 18).

And if the "i" button is again operated while the Internet-linked application AppH is being displayed, the display of the currently executing Internet-linked application AppH is terminated and the state in which only the program picture P1 is displayed is restored.

In the manner explained above, the reception apparatuses 12, 112 and 212 allow both the data broadcast application AppD based on data broadcasting and the Internet-linked application AppH based on hybrid broadcasting to be executed in linkage with TV programs.

As described above, data broadcasting and hybrid broadcasting are expected to coexist from now on for selective utilization. The broadcasting organizations may need to supplement their TV programs with information for implementing relevant functions of both data broadcasting and hybrid broadcasting, while the reception apparatuses may need to have the capabilities to address these functions of data broadcasting and hybrid broadcasting. Under such circumstances, it is desired that with hybrid broadcasting already in use, the user also make selective use of data broadcasting. In such cases, the reception apparatuses 12, 112 and 212 capable of executing both the data broadcast application AppD and the Internet-linked application AppH readily permit the selective utilization of the two kinds of broadcasting.

[Explanation of the Computer to which this Technology is Applied]

The series of processes described above may be executed either by hardware or by software. Where the processes are to be carried out by software, the programs constituting the software are installed into a suitable computer for execution. Such computers may include those incorporated in their dedicated hardware beforehand, and those such as general-purpose personal computers or the like capable of executing diverse functions based on various programs installed therein.

FIG. 19 is a block diagram showing a typical hardware structure of a computer 300 capable of carrying out the above-described series of processes using programs.

In the computer 300, a CPU (Central Processing Unit) 301, a ROM (Read Only Memory) 302, and a RAM (Random Access Memory) 303 are interconnected via a bus 304.

An input/output interface 305 is also connected to the bus 304. The input/output interface 305 is connected with an input device 306, an output device 307, a recording device 308, a communication device 309, and a drive 310.

The input device 306 is generally made up of a keyboard, a mouse, and a microphone. The output device 307 is typically composed of a display and speakers. The recording device 308 is usually formed by a hard disk, a nonvolatile memory or the like. The communication device 309 is generally constituted by a network interface. The drive 310 drives pieces of removable media 311 such as magnetic disks, optical disks, magneto-optical disks, and semiconductor memories.

In the computer 30 structured as outlined above, the CPU 301 performs the above-described series of processes by loading suitable programs from the recording device 308 into the RAM 303 via the input/output interface 305 and bus 304 and by executing the loaded programs.

For example, the programs executed by the computer 300 (i.e., CPU 301) may be offered recorded on the removable media 311 constituting package media or the like. The programs may also be offered through wired or wireless transmission media such as local area networks, the Internet, and digital satellite broadcasts.

When a suitable piece of the removable media 311 carrying the relevant programs is attached to the drive 310, the programs are installed from the medium into the recording device 308 through the input/output interface 305. Alternatively, the programs may be received by the communication device 309 through wired or wireless transmission media before getting installed into the recording device 308. As another alternative, the programs may be preinstalled in the ROM 302 or in the recording device 308.

Also, the programs to be executed by the computer 300 may be processed in the depicted sequence of this specification (i.e., on a time series basis), in parallel, or in otherwise appropriately timed fashion such as when they are invoked.

In this specification, the processing steps that describe the programs for causing the computer 300 to perform diverse operations may not represent solely the processes that are to be carried out in the depicted sequence in the flowcharts (i.e., on a time series basis); the steps may also represent processes that are conducted parallelly or individually (e.g., in parallel or object-oriented fashion).

The programs may be processed by a single computer or by a plurality of computers on a distributed basis. The programs may also be transferred to a remote computer or computers for execution.

In this specification, the term "system" refers to an aggregate of a plurality of components (devices, modules (parts), or the like). It does not matter whether or not all components are housed in the same enclosure. Thus, a system may be configured with a plurality of devices housed in separate enclosures and interconnected via a network, as well as with a single device that houses a plurality of modules in a single enclosure.

Although the description above contains many specificities, these should not be construed as limiting the scope of the disclosure but as merely providing illustrations of some of the presently preferred embodiments of this disclosure. It is evident that many alternatives, modifications and variations will become apparent to those skilled in the art in light of the foregoing description.

For example, the disclosed technology may be configured as a cloud computing setup in which one function is processed cooperatively by a plurality of devices on a shared basis via a network.

Also, each of the steps making up the processes in the above-described flowcharts may be performed either by a single device or by a plurality of devices on a shared basis.

Furthermore, if any one step includes a plurality of processes, these processes may be carried out either by a single device or by a plurality of devices on a shared basis.

The technology of this disclosure may also be configured as follows:

(1) A reception apparatus including:
a reception block configured to receive AV content;
a definition information acquisition block configured to acquire definition information defining the life cycle of an application program to be executed in linkage with the AV content;
an application acquisition block configured to acquire the application program distributed over a network in accordance with the acquired definition information; and
a control block configured to control the performance of the acquired application program.

(2) The reception apparatus as described in paragraph (1) above,
wherein the definition information acquisition block acquires the definition information transmitted along with the AV content, if the acquired definition information designates a start of the application program, the control block starts the acquired application program, and if the definition information designates an end of the application program, the control block terminates the currently executing application program.

(3) The reception apparatus as described in paragraph (2) above, wherein the definition information defines the life cycles of a plurality of the application programs, and the control block controls the performance of each of the application programs in accordance with the acquired definition information.

(4) The reception apparatus as described in paragraph (1) above, wherein, in accordance with information designating an acquisition destination of the definition information transmitted along with the AV content, the definition information acquisition block acquires first definition information which is distributed over the network and which defines the life cycle of a first application program, and if the acquired first definition information designates a start of the first application program, the control block starts the first application program.

(5) The reception apparatus as described in paragraph (4) above, wherein, if an instruction is given along with the AV content to designate a change of the application program in accordance with the progress of the AV content, the definition information acquisition block acquires second definition information defining the life cycle of a second application program to be executed next to the currently executing first application program, the second definition information being distributed over the network, in accordance with the acquired second definition information, the application acquisition block acquires the second application program distributed over the network, and the control block starts the acquired second application program and terminates the currently executing first application program.

(6) The reception apparatus as described in paragraph (4) above, further including a set block configured to set a timing for changing from the currently executing first application program to a second application program to be executed next in accordance with the progress of the AV content, wherein, at the timing of changing from the first application program to the second application program, the definition information acquisition block acquires second definition information defining the life cycle of the second application program, in accordance with the acquired second definition information, the application acquisition block acquires the second application program distributed over the network, and the control block starts the acquired second application program and terminates the currently executing first application program.

(7) The reception apparatus as described in any one of paragraphs (1) through (6) above, wherein, if a user designates a start of the performance of the application program, the definition information acquisition block acquires the definition information.

(8) The reception apparatus as described in any one of paragraphs (1) through (7) above, further including a data broadcast control block configured to control the performance of a data broadcast application program transmitted along with the AV content.

(9) A reception method for use with a reception apparatus, the reception method including:

causing the reception apparatus to receive AV content;

causing the reception apparatus to acquire definition information defining the life cycle of an application program to be executed in linkage with the AV content;

causing the reception apparatus to acquire the application program distributed over a network in accordance with the acquired definition information; and causing the reception apparatus to control the performance of the acquired application program.

(10) A program for causing a computer to function as an apparatus including:

a reception block configured to receive AV content;

a definition information acquisition block configured to acquire definition information defining the life cycle of an application program to be executed in linkage with the AV content;

an application acquisition block configured to acquire the application program distributed over a network in accordance with the acquired definition information; and a control block configured to control the performance of the acquired application program.

The present disclosure contains subject matter related to that disclosed in Japanese Priority Patent Application JP 2012-007701 filed in the Japan Patent Office on Jan. 18, 2012, the entire content of which is hereby incorporated by reference.

What is claimed is:

1. A reception apparatus comprising:

circuitry configured to:

receive audio-video content that is broadcasted as digital TV broadcast signals over a broadcast network;

acquire definition information, including a first and a second definition information, defining life cycles of first and second application programs, respectively, to be executed in linkage with the audio-video content, the definition information being acquired over a network different from the broadcast network;

acquire the first and second application programs, distributed over the network different from the broadcast network, in accordance with information designating one or more acquisition destinations on the network of the first and second application programs, the information being included in the acquired definition information;

analyze the acquired second definition information defining the life cycle of the acquired second application program; and control and maintain a performance of the acquired first application program based on the analysis of the acquired second definition information.

2. The reception apparatus according to claim 1, wherein when the acquired first definition information designates a start of the first application program, the circuitry starts the acquired first application program, and when the acquired first definition information designates an end of the first application program, the circuitry terminates the first application program, currently being executed by the reception apparatus.

3. The reception apparatus according to claim 2, wherein the definition information defines life cycles of a plurality of application programs, and the circuitry controls performance of each of the plurality of application programs in accordance with the acquired definition information.

4. The reception apparatus according to claim 1, wherein, in accordance with the information designating the one or more acquisition destinations included in the definition information, the circuitry acquires the first definition information which defines the life cycle of the first application program over the network, and when the acquired definition information designates a start of the first application program, the circuitry starts the first application program.

5. The reception apparatus according to claim 4, wherein, when an instruction is given along with the audio-video content to change the first application program in accordance with progress of the audio-video content, the circuitry acquires other definition information defining a life cycle of another application program to be executed after the first application program currently being executed, the other application program being distributed over the network different from the broadcast network, in accordance with the acquired other definition information, the circuitry acquires the other application program distributed over the network different from the broadcast network, and the circuitry starts the acquired other application program and terminates the currently executing first application program.

6. The reception apparatus according to claim 4, wherein the circuitry is configured to set a timing for changing from the first application program currently being executed to another application program to be executed next in accordance with progress of said audio-video content, at the timing of changing from the currently executing first application program to the other application program, the circuitry acquires other definition information defining a life cycle of the another application program, in accordance with the acquired other definition information, the circuitry acquires the other application program distributed over the network different from the broadcast network, and the circuitry starts the acquired other application program and terminates the currently executing first application program.

7. The reception apparatus according to claim 1, wherein, when a user designates a start of performance of the first application program, the circuitry acquires the first definition information.

8. The reception apparatus according to claim 1, wherein the circuitry is configured to control a performance of a data broadcast application program transmitted along with the audio-video content.

9. A reception method for use with a reception apparatus, the reception method comprising:

causing the reception apparatus to receive audio-video content that is broadcasted as digital TV broadcast signals over a broadcast network;

causing the reception apparatus to acquire definition information, including a first and a second definition information, defining life cycles of first and second application programs, respectively, to be executed in linkage with the audio-video content, the definition information being acquired over a network different from the broadcast network;

causing the reception apparatus to acquire the first and second application programs, distributed over the network different from the broadcast network, in accordance with information designating one or more acquisition destinations on the network of the first and second application programs, the information being included in the acquired definition information;

causing the reception apparatus to analyze the acquired second definition information defining the life cycle of the acquired second application program; and causing the reception apparatus to control and maintain a performance of the acquired first application program based on the analysis of the acquired second definition information.

10. A non-transitory computer-readable medium, including a set of computer-executable instructions, which when executed by a computer cause the computer to execute a reception method for use with a reception apparatus, the reception method comprising:

causing the reception apparatus to receive audio-video content that is broadcasted as digital TV broadcast signals over a broadcast network;

causing the reception apparatus to acquire definition information, including a first and a second definition information, defining life cycles of first and second application programs, respectively, to be executed in linkage with the audio-video content, the definition information being acquired over a network different from the broadcast network;

causing the reception apparatus to acquire the first and second application programs distributed over the network different from the broadcast network, in accordance with information designating one or more acquisition destinations on the network of the first and second application programs, the information being included in the acquired definition information;

causing the reception apparatus to analyze the acquired second definition information defining the life cycle of the acquired second application program; and causing the reception apparatus to control and maintain a performance of the acquired first application program based on the analysis of the acquired second definition information.

11. The reception apparatus according to claim 1, wherein the network different from the broadcast network is the Internet.

12. The reception method according to claim 9, wherein the network different from the broadcast network is the Internet.

13. The non-transitory computer-readable medium according to claim 10, wherein the network different from the broadcast network is the Internet.

14. The reception apparatus according to claim 1, wherein the circuitry is further configured to detect an event message transmitted along with the audio-video content over the broadcast network.

15. The reception apparatus according to claim 14, wherein the performance of the acquired first application program is controlled in accordance with the acquired second definition information and the detected event message.

* * * * *